United States Patent [19]

Murata et al.

[11] Patent Number: 5,342,634
[45] Date of Patent: Aug. 30, 1994

[54] ENCASED INSTANTLY COOKABLE PASTA

[75] Inventors: Susumu Murata, Takatsuki; Masako Sano, Osaka; Yasuo Takeuchi, Tokyo; Masayuki Fujihara, Gunma; Hisahiko Yokoo, Takasaki; Kenjiro Nakanishi; Tetsuo Miura, both of Takatsuki; Yoshio Shimizu, Gunma, all of Japan

[73] Assignee: Kanebo, Ltd., Tokyo, Japan

[21] Appl. No.: 15,302

[22] Filed: Feb. 9, 1993

Related U.S. Application Data

[63] Continuation of Ser. No. 722,611, Jun. 26, 1991, abandoned.

[30] Foreign Application Priority Data

Jul. 3, 1990 [JP] Japan ................... 2-71359

[51] Int. Cl.⁵ .................. A23L 1/16; A23L 1/162; B65D 81/34
[52] U.S. Cl. .................... 426/113; 426/120; 426/412; 426/451; 426/557
[58] Field of Search ............... 426/113, 412, 415, 115, 426/120, 557, 451

[56] References Cited

U.S. PATENT DOCUMENTS

| | | | |
|---|---|---|---|
| 2,236,641 | 4/1941 | Karmon | 426/120 |
| 2,969,292 | 1/1961 | Heller | 426/113 |
| 3,012,895 | 12/1961 | Stelnicki | 426/113 |
| 3,081,174 | 3/1963 | Gay | 426/113 |
| 3,395,025 | 7/1968 | Hermanson | 426/113 |
| 3,537,862 | 11/1970 | Peters et al. | |
| 3,563,768 | 2/1971 | Melnick | 426/120 |
| 3,615,712 | 10/1971 | Keller | 426/113 |
| 3,689,291 | 9/1972 | Draper | 426/113 |
| 3,928,045 | 12/1975 | Tsunoda et al. | 406/113 |
| 3,976,795 | 8/1976 | Ando | 426/412 |
| 4,018,355 | 4/1977 | Ando | 426/120 |
| 4,018,904 | 4/1977 | Muraoka | 426/115 |
| 4,348,421 | 9/1982 | Sakakibara et al. | 426/120 |
| 4,368,210 | 1/1983 | Murakami et al. | |
| 4,514,426 | 4/1985 | Jordan et al. | 426/412 |
| 4,737,370 | 4/1988 | Huster et al. | 426/412 |
| 4,803,088 | 2/1989 | Yamamoto et al. | 406/113 |

FOREIGN PATENT DOCUMENTS

| | | |
|---|---|---|
| 624834 | 3/1963 | Belgium . |
| 4825583 | 4/1952 | Canada ................. 426/412 |
| 969139 | 6/1975 | Canada ................. 426/114 |
| 1049685 | 8/1955 | Fed. Rep. of Germany ...... 426/113 |

(List continued on next page.)

OTHER PUBLICATIONS

Ethyl Corp. Publication: "Visqueen Film Products".
Food Engineering Jun. 1959 p. 27.
Food Engineering Sep. 1957 p. 83.

*Primary Examiner*—Steven Weinstein
*Attorney, Agent, or Firm*—Oblon, Spivak, McClelland, Maier & Neustadt

[57] ABSTRACT

Described herein are method and apparatus for producing instantly cookable pasta including various kinds of pasta and Chinese and Japanese noodles, and an encased instantly cookable pasta produced by such method and apparatus. According to the invention, part of raw dough of a starting mixture, which contains wheat flour as a major component, is subjected to preliminary steam-cooking, and then mixed with the remaining uncooked part of the starting mixture. The resulting mixture is then processed through shaping, steam-cooking and drying stages to obtain instantly cookable pasta, enshrouding the instantly cookable pasta product in a water-permeable casing before shipment. Due to suppression of thermal degeneration of gluten, the instantly cookable pasta possesses favorable resiliency and is free of the smell inherent to raw wheat flour and cohesion of individual pasta cords. In order to restore the cooked edible state, the encased pasta can be put in hot water together with the casing, permitting hot water to impregnate uniformly into the pasta. The water-permeable casing facilitates the handling of the pasta in cooking and improves its restorative quality to obtain cooked pasta of palatable touch and flavor.

6 Claims, 15 Drawing Sheets

FOREIGN PATENT DOCUMENTS

| | | | |
|---|---|---|---|
| 2243890 | 4/1975 | France | 426/113 |
| 48-28064 | 8/1973 | Japan | 426/113 |
| 49-15780 | 4/1974 | Japan . | |
| 56-39614 | 9/1981 | Japan . | |
| 57-91164 | 6/1982 | Japan | 426/113 |
| 57-122762 | 7/1982 | Japan . | |
| 59-169463 | 9/1984 | Japan | 426/113 |
| 62-247 | 1/1987 | Japan | 426/412 |
| 63-248366 | 10/1988 | Japan . | |
| 1124357 | 5/1989 | Japan | 426/113 |
| 1171442 | 7/1989 | Japan | 426/113 |
| 1231861 | 9/1989 | Japan . | |
| 13374 | of 1909 | United Kingdom | 426/113 |
| 952443 | 3/1964 | United Kingdom | 426/113 |
| 965498 | 7/1964 | United Kingdom | 426/113 |
| 1013665 | 12/1965 | United Kingdom | 426/113 |
| 1545907 | 5/1979 | United Kingdom | 426/113 |
| 2117350 | 10/1983 | United Kingdom | 426/113 |

Fig. 17
(a)
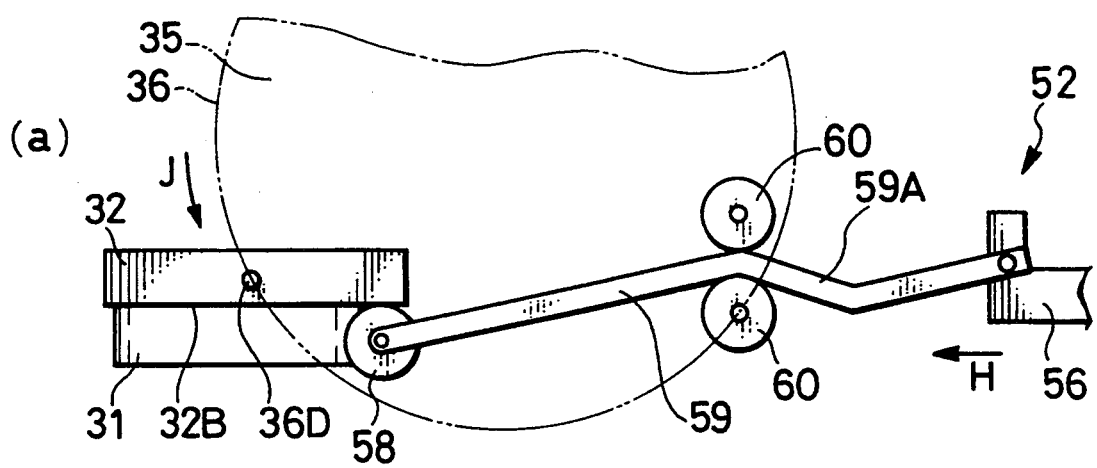
(b)
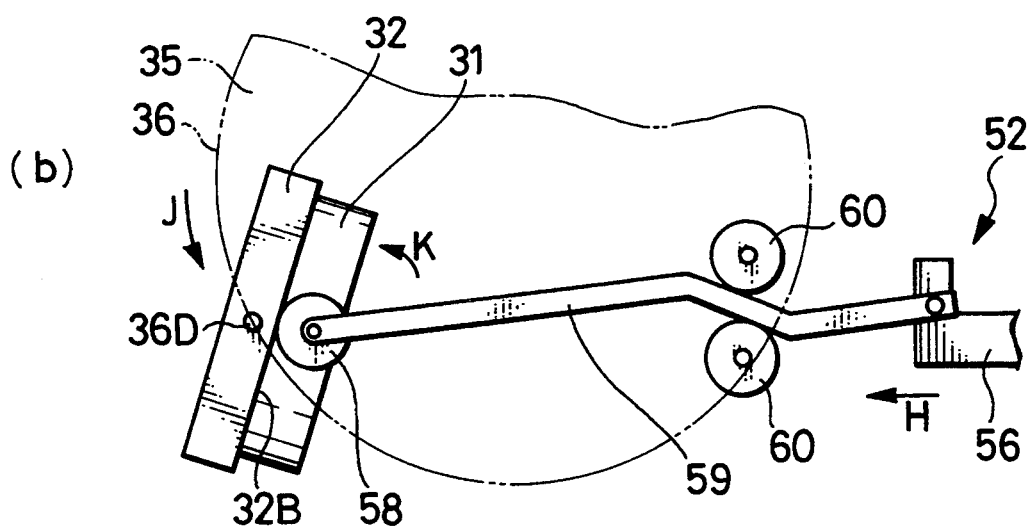
(c)
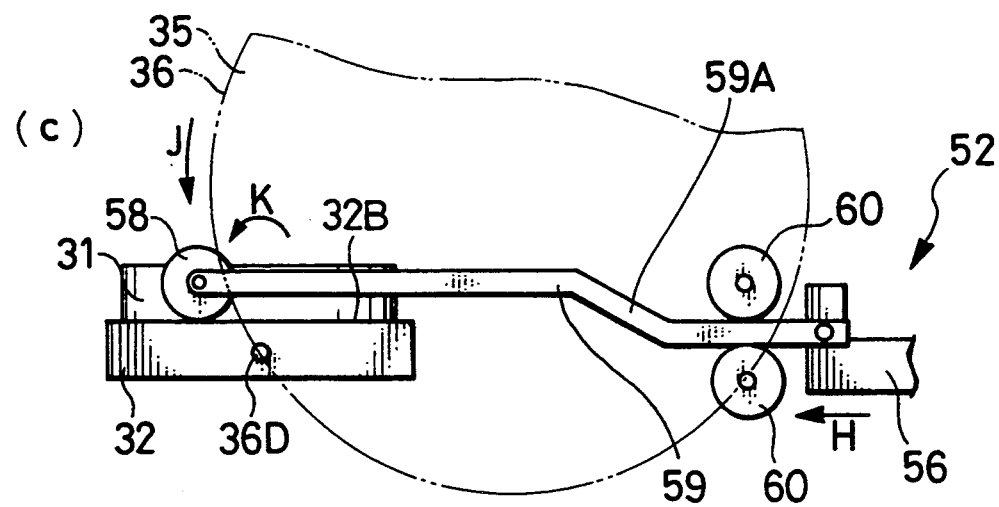

ENCASED INSTANTLY COOKABLE PASTA

This application is a continuation of application Ser. No. 07/722,611, filed on Jun. 26, 1991, now abandoned.

BACKGROUND OF THE INVENTION

1. Field of the Invention

This invention relates to encased instantly cookable pasta including various types of pasta and Chinese and Japanese noodles, and method and apparatus for producing such instantly cookable pasta.

2. Background of the Invention

Generally, a variety of pasta, Chinese noodle and Japanese noodle are available in an uncooked, semi-cooked or dried form. When serving noodle as a cold dish, it is usually boiled in water for a predetermined time period, scooped up into a wire basket and then washed with cold water in a bowl or the like.

Upon boiling wheat or buckwheat noodle or vermicelli or Chinese noodle, exudation of starch components is likely to occur, forming slimy covering on the surfaces of noodle threads. In order to remove the slimy covering, which impairs not only the palatable touch of the noodle but also the flavor of the soup, the boiled noodle is usually washed in cold or hot water provided separately from the first-mentioned hot water in which the noodle was boiled. Immediately before being served, the noodle is warmed again in fresh hot water.

However, a difficulty is often encountered in that the noodle threads are apt to break off or flow out when taking them out of boiling water or when washing them with hot or cold water. Besides, each time when washing noodle in water, a wire basket or other container has to be provided to collect the washed noodle, taking a great deal of time and effort. While washing in water, the individual noodle threads have to be separated from each other with meticulous skill to remove the slimy covering to a sufficient degree without breakage of the noodle threads, since the slimy covering would otherwise impair the flavor of the soup as mentioned hereinbefore.

In case of instantly cookable noodle which can restore cooked edible state upon boiling in hot water for 3 to 5 minutes, the noodle is usually formed into a structure which is porous, reduced in thickness or hollowed to shorten the time of restoration at the sacrifice of cord strength as compared with dry noodle or vermicelli. Therefore, if the instant-cooking noodle is thrown into hot boiling water, it is swirled in the boiling water and caused to lose the "aldente" consistency to such a degree as would impair its taste. Especially, hollowed Bucatini type instantly cookable spaghetti is susceptible to the loss of "aldente" consistency when swirled in boiling hot water, resulting in problems such as degraded taste of the spaghetti itself, irregularities in the degree of cooking or ready breakage of the individual cords while being eaten.

Aside from the problems which arise when boiling the pasta in preparation of a meal, the instantly cookable pasta has the following problems.

As known, for example, from Japanese Patent Publication No. 49-15780 and its corresponding U.S. Pat. No. 3,537,862 (hereinafter referred to simply as "the other prior art" for brevity), it has been the usual practice to produce instant-cooking pasta by mixing (kneading) strong wheat flour or the like with 20–40 wt % of water, forming the resulting mixture into raw pasta cords or strips of a predetermined shape with the use of a suitable shaping means such as shaping rollers or extruder, cooking the shaped pasta in steam, and drying the cooked pasta.

In the just-mentioned other prior art method in which uncooked raw pasta cords from a pasta shaping means are subjected to steam-cooking and drying treatments, it is necessary to steam the raw pasta cords to a sufficient degree to obtain an instantly cookable pasta with a relatively shortened time of restoration, by increasing the rate of $\alpha$-conversion in the steam-cooking treatment. However, a difficulty arises in that the individual cords of the pasta tend to stick to each other as a result of exudation of starch components induced by water deposition on the pasta cords under the steam-cooking treatment, making it difficult to turn the pasta into edible state uniformly on preparation of a meal due to bondage, cohesion and deformation of the individual pasta cords.

In this connection, as described in Japanese Patent Publication 56-39614 and corresponding U.S. Pat. No. 4,368,210, the applicants proposed a method of producing instantly cookable pasta by accelerating a-conversion of starch components by subjecting a kneaded mixture of wheat flour and water to preliminary steam-cooking, shaping the resulting mixture into a predetermined form, for example, into a strip- or cord-like form, and, if necessary, depositing water or the like on the surface of the shaped pasta strip or cord, followed by a steam-cooking treatment and drying. This method can suppress exudation of starch at the time of the steam-cooking treatment to prevent cohesion of individual pasta strips or cords, but still has a difficulty in thermally converting all of the gluten content in the kneaded mixture into a desirable gluten structure at the time of the preliminary steaming, resulting in pasta strips or cords which are hardened to an excessive degree and lack elasticity in terms of tasteful touch to the mouth, the pasta strips or cords being increased only in viscosity to give a sticky touch to the teeth instead of a palatable feeling. Besides, the high viscosity after the preliminary steam-cooking makes it difficult to form the pasta cords or strips by the use of shaping rolls.

Further, Japanese Laid-Open Patent Application 63-248366 discloses a method of shaping a starting mixture into linear pasta cords by extrusion without preliminary steam-cooking, and loosely separating the individual pasta cords by depositing an emulsion on the surfaces thereof after a primary steam-cooking treatment, followed by secondary steam-cooking and drying treatments. In this case, however, the time for the primary and secondary steam-cooking treatments has to be prolonged as a whole for cooking the elongated linear pasta cords or strips of a greater thickness or breadth free of waves or crimps like spaghetti. Since the individual pasta cords (strips) have a greater area of contact, they tend to stick to each other during the cooking treatments in the absence of effective means for preventing bondage of the pasta cords or strips, failing to improve the palatable feeling in terms of smoothness and resiliency.

SUMMARY OF THE INVENTION

In view of the above-mentioned problems of the prior art, the present invention has as its object the provision of a method and an apparatus for producing instantly cookable pasta, preliminarily steam-cooking part of a starting wheat flour mixture and mixing the preliminarily steam-cooked wheat flour mixture with the uncooked part of the wheat flour mixture prior to a shaping stage thereby effectively suppressing thermal degeneration of all gluten contents in the wheat flour mixture to ensure smoothness and resiliency of the pasta which are favorable in terms of palatable feeling and at the same time preventing bondage of the individual pasta cords or strips of even elongated linear forms or of relatively large thicknesses or widths with a large area of contact.

It is another object of the present invention to provide instantly cookable pasta enshrouded in a casing in such a way as to facilitate the handling of the pasta in preparation of a meal, namely, in recovering same from hot water after boiling and in washing the boiled pasta with water, retaining the tasteful touch of the pasta without deteriorations in shape and flavor before serving.

According to one aspect of the invention, there is provided, for achieving the above-stated objectives, encased instantly cookable pasta, which is composed of instantly cookable pasta strips of predetermined shape formed by shaping and drying a mixture containing wheat flour as a major component, and a bag-like casing enshrouding the pasta and formed of heat-resistant and water-permeable material.

In use, the pasta in the water-permeable casing is put in hot water, whereupon hot water is permitted to permeate through the casing and cook the encased pasta strips uniformly. The casing prevents the pasta strips from whirling in boiling water and continuedly traps in the pasta strips while the latter are being boiled.

Preferably, the pasta in the water-permeable casing is sealed in an outer casing for storage over an extended time period in a hygienic state. The outer casing may contain a bag or bags of seasonings or flavors to be conveniently used when cooking or serving the pasta.

In accordance with another aspect of the invention, there is provided a method for producing instantly cookable pasta, the method including the steps of: preparing dough of a starting mixture containing wheat flour as a major component and having a predetermined water content; dividing the starting mixture into first and second portions in such a way as to apportion 5–90%:95–10% by weight to the first portion; preliminarily steam-cooking the first portion of the starting mixture; mixing the cooked first portion of the mixture with the uncooked second portion; forming the resulting mixture into raw pasta strips of a predetermined shape; subjecting the pasta strips to a primary steam-cooking treatment; loosening and subjecting the primarily cooked pasta strips to a secondary steam-cooking treatment; and drying the secondarily cooked pasta strips.

In this case, preferably the shaped raw pasta strips are cut into a predetermined unit length and charged into cups each in a predetermined amount to undergo the primary and secondary steam-cooking treatments within the cups. Preferably, hot water is sprayed over the pasta strips after the primary steam-cooking to accelerate the α-conversion, and then an aqueous emulsion and compressed air are sprayed toward the surfaces of the pasta as a whole to loosely separate the pasta strips.

In this connection, it is desirable to separate the individual pasta strips loosely from each other by simultaneous injection of an emulsion and compressed air at a point between the primary and secondary steam-cooking stages or between the secondary steam-cooking and drying stages.

Preferably, after the secondary steam-cooking, each cup which holds the cooked pasta strips is turned upside down to transfer them in an inverted state into a second cup, and the past strips are loosened in the second cup prior to the drying stage. In the drying stage, preferably hot air is injected toward the pasta through the bottom of each cup at a time point when the water content in the pasta reaches a predetermined level.

With the above-described arrangement, the first portion of the starting mixture, divided in a proportion of 5–90 wt %, is firstly subjected to steam-cooking or preliminary steam-cooking and then mixed with the uncooked second portion before forming the mixture into raw pasta strips of a predetermined shape, so that the gluten in the raw pasta can form a desirable gluten structure without undergoing thermal degeneration in its entirety. The preliminary steam-cooking of the first portion of the starting mixture prevents exudation of starch components from the shaped pasta cords or strips in the secondary steam-cooking stage subsequent to the primary steam-cooking, while precluding bondage of individual pasta cords or strips and accelerating wet-swelling of starch components to impart an increased viscosity to the pasta for improvement of the aldente touch (resiliency and consistency). In the cutting stage subsequent to the shaping operation, the shaped raw pasta strips can be cut off without crushing thanks to the preliminarily cooked content in the raw pasta strips. In addition, cracking of the pasta strips is suitably prevented in the drying stage.

After being cut into a unit length, a predetermined amount of raw pasta is preferably charged into cups to carry out the succeeding steps of the process, from the steam-cooking to drying stage, in a more compact form as a whole, efficiently separating the individual pasta strips from each other by the use of hot water or an aqueous emulsion and compressed air after the preliminary steam-cooking and making it easier to prevent the pasta cords or strips from getting out of shape within the cups.

For steam-cooking the predetermined amount of raw pasta which has been filled in a cup, the steam-cooking process is preferably divided into two stages, spraying an emulsion and compressed air toward the surfaces of the pasta strips in the course of or immediately after the steam-cooking of the first stage thereby depositing the emulsion uniformly on the pasta surfaces to prevent cohesion of the individual pasta cords or strips and promptly discharging excessive emulsion. While the pasta in the cup is turned upside down in an inverting stage, the individual pasta strips are loosened to ensure uniform quality of the whole pasta content in the cup.

Further, in the drying stage, hot air is injected from the lower side at a time point when the moisture content of the pasta in the cup reaches a predetermined level, drying and setting the pasta in a bulky form with increased interstices between the individual pasta cords or strips and ensuring accelerated and uniform impregnation of hot water into the pasta strips at the time of restoration of the edible state.

According to a further aspect of the invention, there is provided an apparatus for producing instantly cookable pasta, the apparatus essentially including in combination: a mixing means for preparing raw dough of a starting mixture containing wheat flour as a major component and having a predetermined water content; an apportioning means for dividing the raw dough into first and second portions in a predetermined ratio; a preliminary cooking means for steam-cooking the first portion of the starting mixture; a second mixing means for mixing the cooked first portion with the uncooked second portion of the starting mixture; a shaping means for forming the resulting mixture into raw pasta strips of a predetermined shape; a cutter means for cutting the shaped raw pasta strips into a predetermined unit length; a first cup transfer means adapted to charge a predetermined amount of the raw pasta strips in a number of cups and transfer the charged cups to a downstream position; a plural number of cooking means located in the path of the first cup transfer means for steam-cooking the pasta in the cups; a pasta loosening means located at least a position between the respective cooking means in the path of the first cup transfer means for spraying an emulsion and compressed air toward the pasta strips in the cups; an inverting means located downstream of the first cup transfer means for turning the cooked pasta strips in the cups upside down; a second cup transfer means adapted to receive the inverted pasta strips in second cups for transfer further to the downstream side; and a drying means located in the path of travel of the second cup transfer means for drying the pasta in the second cups as instantly cookable pasta.

With the apparatus of the above-described arrangement, the shaped raw pasta is cut into a unit length and then filled in a cup in a predetermined amount prior to the steam-cooking and drying treatments to carry out these treatments in a compact form. After spraying an emulsion and compressed air toward the pasta within the cup, the pasta is turned upside down at a position between the first and second cup transfer means, thereby loosely separating the individual pasta cords or strips from each other to prevent their cohesion in the succeeding steam-cooking treatment in a reliable manner.

Preferably, the above-mentioned cutter means includes a guide means for guiding the shaped raw pasta downward, a hopper means located on the lower side of the guide means opposingly with a gap space therebetween for receiving the raw pasta downwardly guided by the guide means, and a cutter located between the hopper and guide means and provided with a rotary cutter blade movable through the gap space to cut the raw pasta into a unit length, the guide and hopper means holding the pasta against swinging motions which would deform the cross-sectional shape at the cut ends of the pasta.

On the other hand, the first cup transfer means is constituted by a chain conveyer which is provided with a plural number of cup retainers at predetermined intervals in the direction of travel, each cup retainer holding a plural number of cups thereon side by side in an array. Each one of the cup retainer on the chain conveyer is preferably mounted rotatably about a support shaft. Accordingly, a plural number of cups can be transferred by the cup retainers on the chain conveyer, subjecting the pasta in the respectively cups collectively to the steam-cooking and other treatments.

The pasta loosening means preferably includes: a plural number of rotary nozzles which are located in positions above the first cup transfer means correspondingly to the respective cups on the cup retainer; a connector rod which connects the respective rotary nozzle integrally with each other; and a rotating plate pivotally connected to one end of the connector rod through a pin to impart rotational movements to the rotary nozzles; spraying an emulsion and compressed air toward the respective cups on the cup retainer from the nozzles to loosen the pasta strips in each one of the cups collectively at one time while discharging excessive emulsion from the respective cups by the compressed air.

The above-mentioned inverting means preferably includes: an inverting rod which is adapted to abut the cup retainer in travel toward the downstream side with the first cup transfer means, at an eccentric position relative to the support shaft; and a rod drive mechanism which is arranged to drive the inverting rod toward the cup retainer to turn the respective cups upside down about the support shaft together with the cup retainer. The inverting rod is pushed toward the cup retainer which is being transferred by the first cup transfer means, thereby turning the cup retainer upside down swiftly together with the respective cups.

The above-mentioned drying means preferably includes a hot air injector which is located on the lower side of the second cup transfer means to inject hot air toward the pasta in each cup from the bottom side thereof. The pasta is floated up within the cup by the injected hot air, forming interstices between the individual unit pieces and thus causing the hot air to contact uniformly with every part of the pasta strips in the cup.

BRIEF DESCRIPTION OF THE DRAWINGS

The above and other objects, features and advantages of the invention will become apparent from the following description and the appended claims, taken in conjunction with the accompanying drawings which show by way of example some preferred embodiments of the invention and in which:

FIGS. 17(a) to 17(c) are schematic views explanatory of the cup retainer inverting operation;

BEST MODE FOR PRACTICING THE INVENTION

Figure 1:
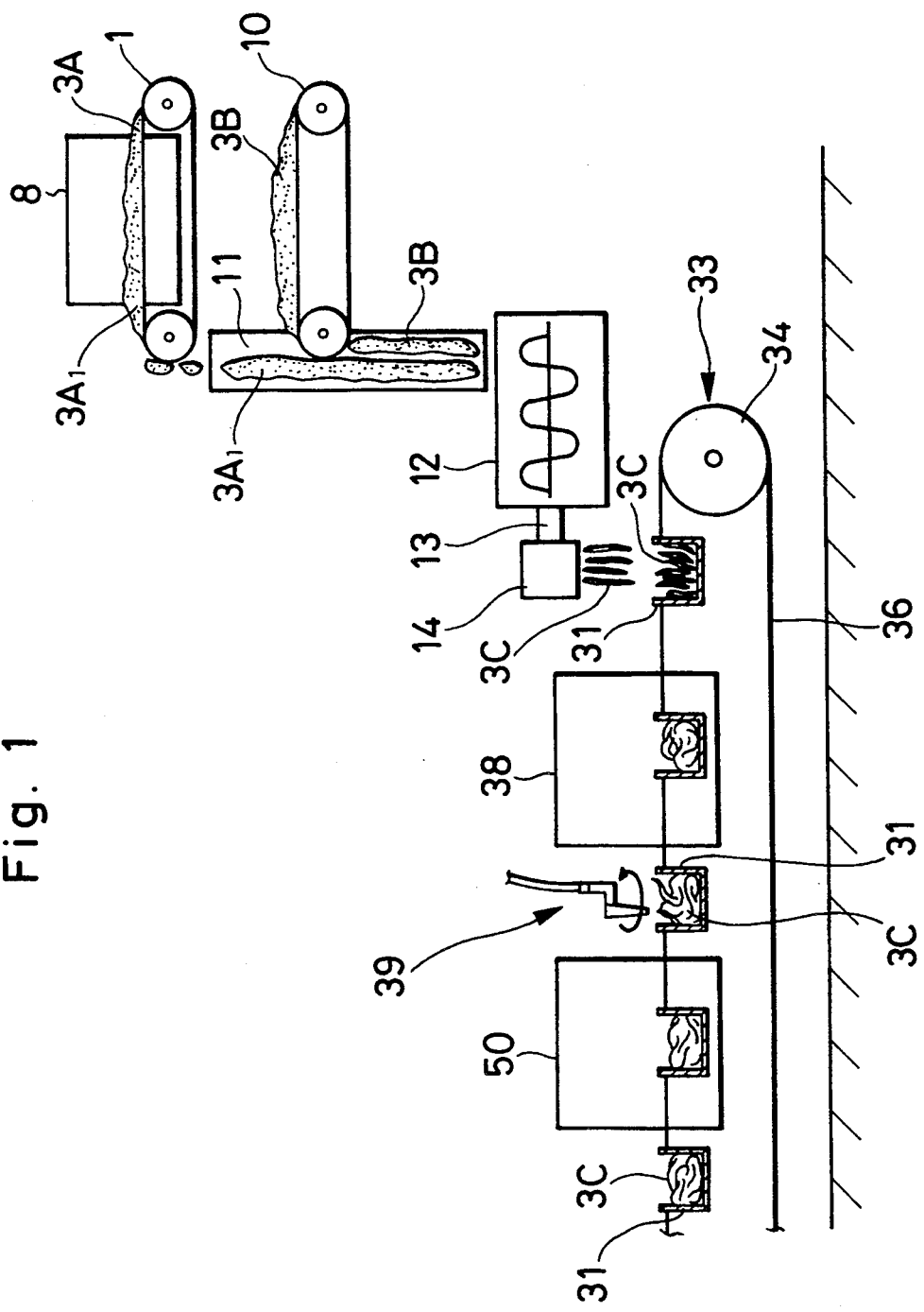
FIG. 1 is a schematic view of an apparatus for producing instantly cookable pasta according to the present invention.

The description is directed firstly to the method of producing the instant-cooking pasta according to the invention.

The term "degree of α-conversion" referred to in this specification means a value as determined by the diastase enzyme test, and the term "water content" used in this specification means a percentage to the dry weight of wheat flour or of a mixture of wheat flour with other cereal grain powder or starch components. The starting material to be employed in the present invention is composed solely of wheat flour such as Durum Semolina, strong wheat flour or the like or composed of a mixture of wheat flour with other cereal grain powder such as rice powder, buckwheat powder, corn powder or the like and/or starch components such as corn starch, potato starch, waxy corn starch, tapioca starch or the like. The starting material has a water content of about 20–40%, preferably 31–33% by weight, and is mixed well preferably with the least kneading action on the material. If necessary, the starting material may be admixed with a known pasta improving agent such as disodium phosphate and glyceryl monostearate, or a food additive or a seasoning agent. The starting material may also contain sodium chloride up to 8% by weight for the purpose of improving the restorative power and palatable tough of the pasta product.

In addition to the above-mentioned pasta improving agents, food additive and seasoning agent which are optionally admixed in the present invention, the pasta improving agent may include a surface active agent such as glycerin fatty acid ester, sucrose fatty acid ester, sorbitan fatty acid ester and lecithin, a water-soluble gum such as cellulose sodium glycolate, sodium polyacrylate and sodium alginate, or a humectant such as propylene glycol and D-sorbitol; the food additive may include sodium starch phosphate ester, sodium caseinate, hydrogen peroxide, L-lysine hydrochloride, vitamins, chlorella or active gluten; and the seasoning agent may include spices, extracts, sodium glutaminate, sodium inosinate, guanylic acid or succinic acid.

Turning firstly to the method of the invention, in an apportioning stage, dough of a starting mixture which has been prepared by mixing Durum Semolina, strong wheat flour or the like with water by a mixer or the like is divided while being transferred by a conveyer or the like to separate a dough portion which corresponds to 5–90% by weight, preferably 10–60% by weight of the starting mixture, by means of an apportioning plate which is located in the path of the conveyer adjustably (for shifts of position in the transverse direction of the conveyer).

In a next preliminary steam-cooking stage, the divided first portion of the starting mixture is steamed in a steam-cooker, which is provided in the path of the conveyer, more specifically, in steam of about 100° C. under normal pressure for about 4 minutes until the α-conversion rate of at least 93% is reached. Then, after cooling off to a temperature below 40° C., for example, the first portion is mixed with the other uncooked portion of the starting material by the use of a mixer or the like.

In this instance, the first portion, which has undergone α-conversion in the preliminary cooking, is mixed with the uncooked second portion, so that, even if thermal degeneration has occurred to the gluten in the first portion, reticulate structures of gluten will be formed to a suitable degree in the mixing stage upon mixing the first portion with the second portion which is free of thermal degeneration, preventing exudation of glue-like starch components to form gluten structure having suitable viscosity and resiliency. As a result, in contrast to a case where the entire starting mixture is subjected to a preliminary steam-cooking, it becomes possible to avoid thermal degeneration of entire gluten in the starting mixture and to impart suitable viscosity and resiliency which will permit roll shaping by the use of shaping rolls.

The resulting mixture is then shaped into raw pasta in the form of elongated cords or strips in the following shaping stage by extrusion molding using a pasta extruder or by the use of shaping rolls. In this instance, the cords or strips of the raw pasta may be cut into a suitable length by means of a circular rotary cutter blade which is rotated at high speed or by means of other pasta cutter. Further, it is desirable to fill a predetermined amount of pasta cords, which have been cut into a suitable unit length, in cups which are being transferred by a conveyer, and, while loosening the individual pasta strips in the cup from each other, to steam-cook and dry them to obtain instantly cookable pasta including spaghetti, vermicelli, noodle and the like.

In a primary steam-cooking step subsequent to the shaping stage, for example, the pasta cords which has been filled in a cap in a predetermined amount are steam-cooked in a steam-cooker which is provided in the path of the conveyer, for about 40 seconds in steam of 100° C. under normal pressure. Thereafter, hot water preferably of 80° or higher may be sprayed on the surfaces of the pasta cords, which have undergone the primary steam-cooking, to accelerate wet-swelling (α-conversion) of starch components in the secondary steam-cooking, followed by spraying of an aqueous emulsion to loosen the pasta cords and prevent their cohesion. Simultaneously, compressed air may be injected toward the pasta cords in the cups to loosen them more effectively. The simultaneously injected compressed air will ensure that the emulsion be deposited uniformly on the surfaces of the individual pasta cords and while accelerating drainage of excess emulsion. Compressed air may be injected subsequently to the spraying stage for the purpose of accelerating drainage of excess emulsion. The emulsifier to be used for the emulsion is preferred to be an aqueous emulsifier of HLB 10 or greater.

In a secondary steam-cooking stage, the pasta cords in each cup is subjected to secondary steam-cooking in a secondary steam-cooker which is provided in the path of the cup transferring conveyer, for example, for about 3 to 4 minutes in steam of 100° C. under normal pressure. After this, the pasta content in the cup is injected with an emulsion and compressed air to separate the individual pasta cords, and then turned upside down upon transfer to another cup. Compressed air is injected into the new cup to loosen the pasta cords uniformly, while removing excessive emulsion and reconditioning the pasta cords into a uniformly distributed state within the cup.

In a drying stage following the secondary steam-cooking, hot air is blasted against the pasta cords to dry same, for example, for 20 to 40 minutes at 90° C. In this instance, as soon as the moisture content of the pasta cords in the cup reaches a predetermined rate, heated air is injected toward the pasta cords from the bottom side of the cup to let the pasta cords contact the air in floated state within the cup. At this point, the moisture content of the pasta cords, which varies depending upon the thickness of the pasta cords, is in the range of 20–55%, preferably in the range of 40–50%, so that interstices between the individual pasta cords can be increased in the course of hardening to dry up and set them in a bulky form within the cup. In the drying stage, the pasta in the cup is dried until its moisture content is reduced to about 10–12% and then cooled for adjustment.

As described above, a portion of the starting mixture is preliminarily steam-cooked and then mixed with the other uncooked portion of the starting mixture prior to shaping it into raw pasta cords, followed by the primary steam-cooking, spraying of hot water for acceleration of α-conversion, loosening of individual pasta cords by the use of an aqueous emulsion and air, and secondary steam-cooking, thereby effectively suppressing exudation of starch components on the surfaces of the pasta cords while preventing cohesion and deformation of the pasta cords. The cohesion of adjacent pasta cords can be effectively prevented even in a case where the pasta cords are of a shape which is susceptible to cohesion, namely, of a linearly elongated shape like spaghetti or in the form of thick cords or wide strips with a broader contact area, or even in a case where exudation of starch components is likely to occur due to a long steam-cooking time. Besides, the commercial value of the pasta can be enhanced by the improvement in palatable feeling particularly in case of instant-cooking pasta which is required to have like spaghetti the "aldente" touch or consistency along with smoothness.

Referring now to FIGS. 1 through 19, there is shown an apparatus for producing the instantly cookable pasta according to the present invention.

In these figures, indicated at 1 is a conveyer which is provided as a transfer means in the preliminary steam-cooking stage and which is located downstream of a wheat flour moistening and mixing unit 2 serving as the mixing means to supply raw dough 3 to a steam-cooker 8 which will be described hereinlater. In this instance, the mixing unit 2 is arranged to mix powdery material consisting of wheat flour such as Durum Semolina, strong wheat flour or the like with 20–40% by weight of water to make the raw dough 3 as a starting mixture. The dough 3 is transferred by a conveyer 4 toward an apportioning mechanism 5 which will be described hereinlater.

Figure 3:
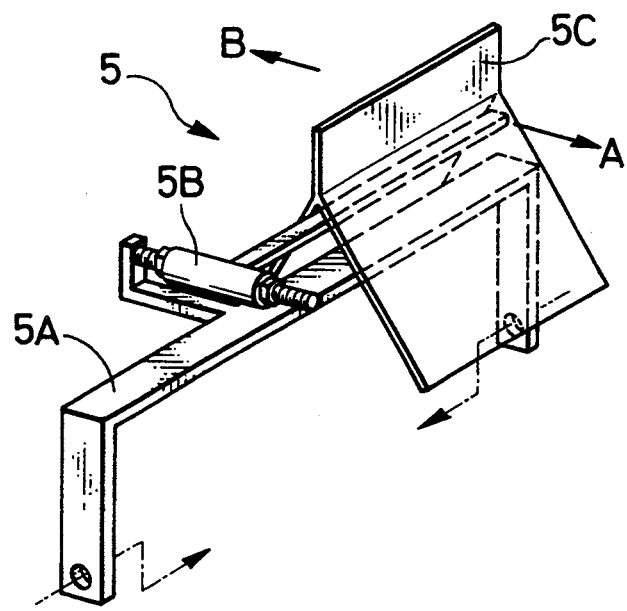
FIG. 3 is an exploded perspective view of the dough apportioning mechanism.

The apportioning mechanism 5 is located downstream of the conveyer 3 to divide the dough 3 on the conveyer 4 into a first portion or dough portion 3A and a second portion or dough portion 3B in predetermined proportions. The divided dough portions 3A and 3B are transferred toward a downstream side by conveyers 1 and 6, respectively. In this instance, as shown in FIG. 3, the apportioning mechanism 5 is constituted by a frame 5A substantially of U-shape which is securely fixed to a support frame (not shown) of the conveyer 1 or to a similar structure, and an apportioning plate 5C which is mounted on the frame 5A adjustably through an adjusting screw 5B which permits shifts of the apportioning plate position in the direction of arrow A or B. As the apportioning plate 5C is shifted in the direction of arrow A by turning the adjusting screw 5B, the apportioning rate of the dough portion 3A is reduced relative to the dough portion 3B. The apportionment of the dough portion 3A is in the range of 5–90%, preferably in the range of 10–60% by weight of the starting mixture.

Figure 4:
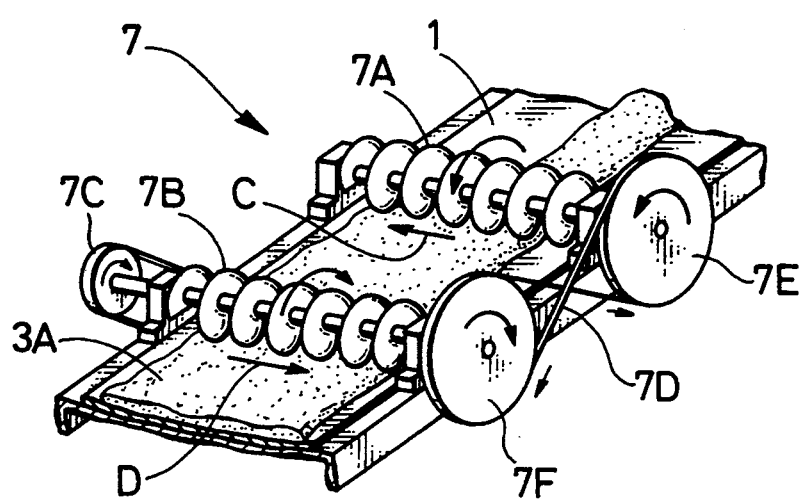
FIG. 4 is a schematic perspective view of a dough leveling mechanism.

Designated at 7 is a leveling mechanism which is constituted, as shown in FIG. 4, by a pair of leveling screws 7A and 7B, a pair of pulleys 7E and 7F, and a crossed belt 7D for rotating the leveling screws 7A and 7B in opposite directions. The dough 3A which is transferred by the conveyer 1 is spread out in the direction of arrows C and D in FIG. 4 into a flat state on the conveyer 1 by the leveling screws 7A and 7B which are in rotation in the opposite directions.

The reference 8 denotes a steam-cooker which is provided as a preliminary cooking means in the path of the conveyer 1 downstream of the leveling mechanism 7, where the dough 3A on the conveyer 1 is subjected to preliminary steam-cooking, for example, for about 4 minutes in steam of 100° C. under normal pressure to form preliminarily cooked dough $3A_1$. The dough 3A is cooked in the steam-cooker 8 to such a degree as to ensure 93% or higher α-conversion of its starch components. Indicated at 9 is a cooler which is provided in the path of the conveyer 1 downstream of the steam-cooker 8, for cooling the preliminarily cooked dough $3A_1$ on the conveyer 1, for example, to a temperature lower than 40° C.

Designated at 10 is a conveyer which is provided side by side with the conveyer 1 to transfer the dough 3B from the conveyer 6 to a conveyer 11 which is provided on the downstream side to transfer the preliminarily cooked dough $3A_1$ from the conveyer 1 and the uncooked dough 3B from the conveyer 10 to a mixer 12 which will be described hereafter.

Figure 2:
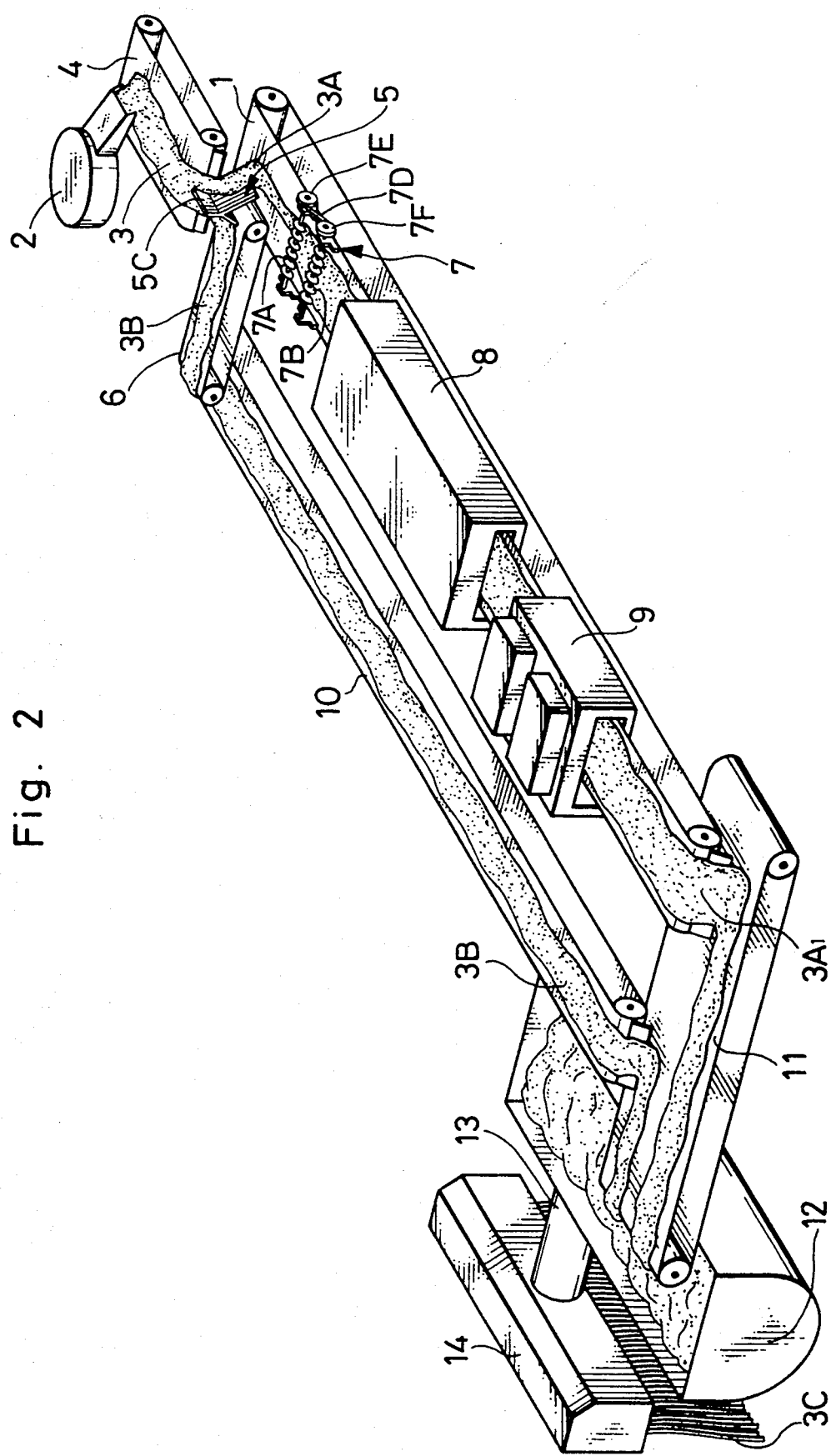
FIG. 2 is a schematic perspective view of a dough apportioning mechanism, a steam-cooker and a mixer.

The mixer 12, which is provided as the mixing means on the downstream of the conveyer 11, uniformly mixes the preliminarily cooked dough $3A_1$ with the uncooked dough 3B which are received from the conveyer 11, introducing the resulting mixture into a molding device 14 which will be described hereinlater, through a tube 13. The molding device 14 functions to form the mixture from the mixer 12 into raw pasta strips of a predetermined shape, and for this purpose may be constituted by a pasta extruder or shaping rollers suitable for forming, for example, raw pasta strips (or cords) 3C as shown in FIGS. 1 and 2. The raw pasta strips 3C are cut into a predetermined unit length, for example, into a length of 3–40 cm by a pasta cutter 15 which will be described hereinlater, filling a predetermined amount of the unit pieces of the pasta into each cup 31 on a conveyer 33.

Figure 5:
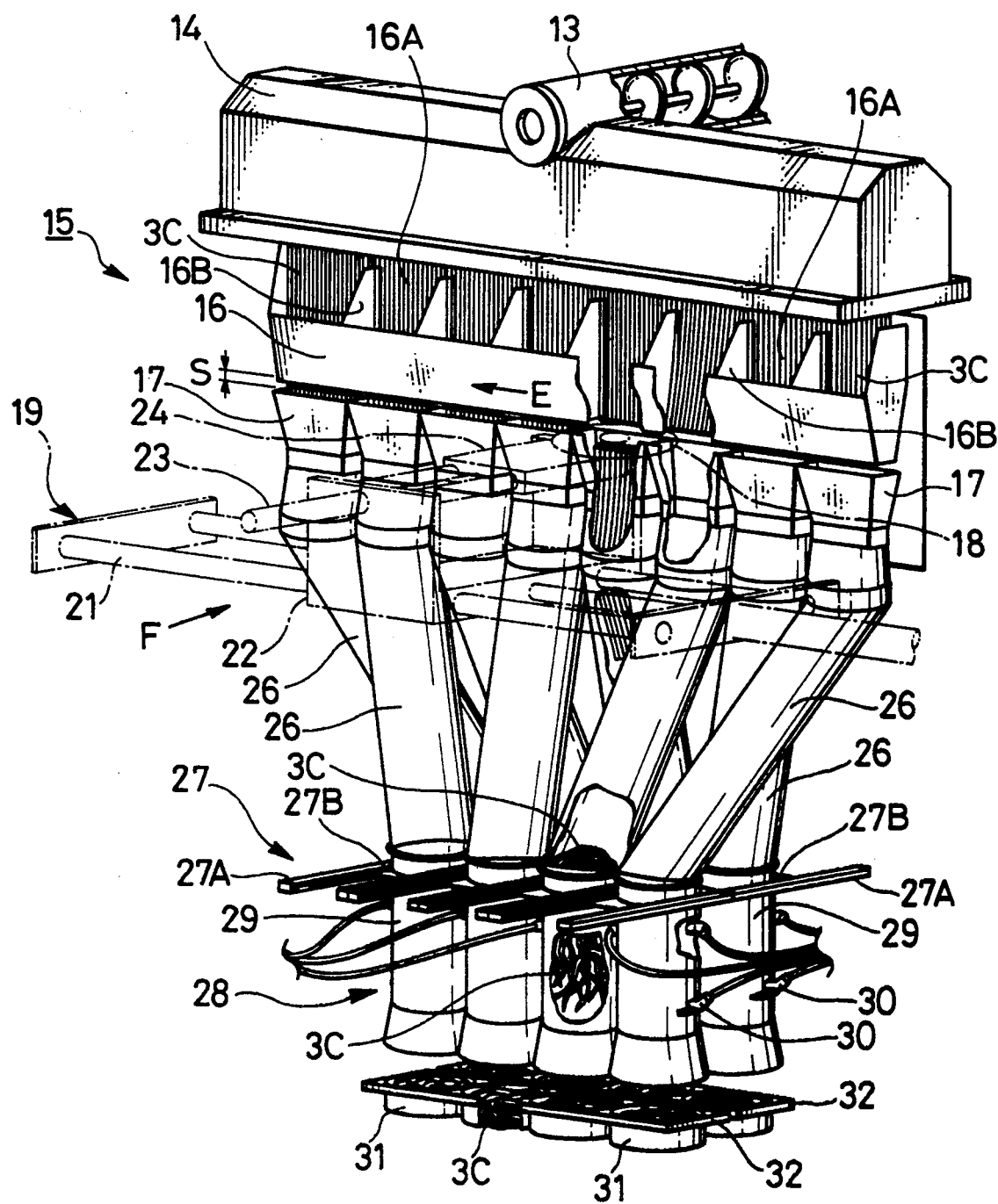
FIG. 5 is an enlarged perspective view of a pasta cutter and associated components.

Referring to FIG. 5, the pasta cutter 15, which serves as a means for cutting the shaped pasta strips 3C into a unit length as mentioned above, is largely constituted by a pasta guide 16 for guiding the shaped pasta strips 3C from the molding device 14 in the downward direction toward a downstream position, hoppers 17 which are located opposingly to the lower end of the pasta guide 16 with a gap space S (e.g., of about 20 mm) therebetween, and a cutter 19 having a rotary blade 18 which is movable in the direction of arrow E in the gap space S between the hoppers 17 and pasta guide 16 to cut the pasta strips 3C into a unit length. The pasta guide 16 is provided with partition plates 16B which define a number of pasta guide passages 16A within the pasta guide 16, for example, eight guide passages 16A correspondingly to the number of the hoppers 17.

Figure 6:
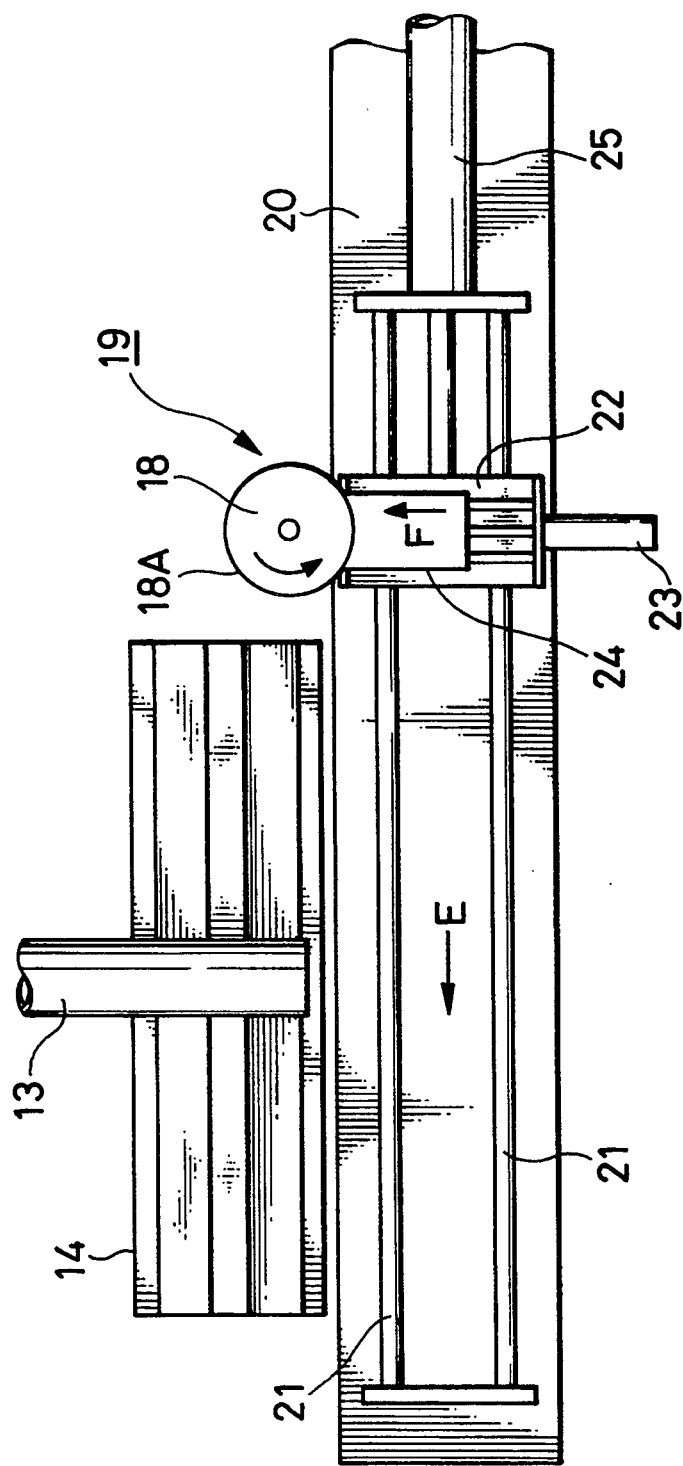
FIG. 6 is a plan view of a pasta molding assembly and a cutter.

In this instance, as shown also in FIG. 6, the cutter 19 is provided with a support plate 20 which is located on the front side of the molding device 14 to extend in the longitudinal direction (in the transverse direction) of the latter, a slider 22 which is slidably mounted on the support plate 20 through a couple of guide rods 21, a cutter motor 24 mounted on the slider 22 for back and forth sliding movements and at the same time movable in the direction of arrow F by means of an air cylinder 23, and another air cylinder 25 for moving the cutter motor 24 in the rightward and leftward directions together with the slider 22 through the respective guide rods 21. The cutter motor 24 is coupled at its fore end with a rotary blade 18, driving the latter, for example, at a speed of 12,000 rpm. While holding the rotary blade 18 in high speed rotation, the cutter motor 24 is moved in the directions of arrows E and F to cut the pasta strips 3C into a unit length between the pasta guide 16 and hoppers 17 by an edge 18A of V-shape in section which is formed around the outer periphery of the rotary cutter blade 18.

In this particular embodiment, the rotary blade 18 with an outer diameter of about 200 mm is moved in the direction of arrow E along the gap space S between the pasta guide 16 and a row of hoppers 17 to cut the pasta strips 3C which are being extruded downward from the molding machine 14, for example, at a speed of 2.5 m/min, sharply cutting the pasta strips 3C with the edge 18A at the outer periphery of the blade 18. At this time, the partition plates 16B of the pasta guide 16 cooperate with the hoppers 17 to hold the pasta strips 3C against sideward swinging motions even in case of hollow pasta strips, effectively preventing deformation of cut ends of the pasta strips 3C which might result from the sideward swinging motions of the pasta strips.

Indicated at 26 are cylindrical chutes which extend downward from the respective hoppers 17 in a somewhat angularly bent fashion, and at 27 is a quantitative pasta distributor which is provided at the lower end of each chute 26. As shown in FIG. 5, the quantitative distributor 27 is constituted by parallelly spaced guide rails 27A extending to the front and rear sides of the chute, and a plural number of shutter plates 27B slidably fitted between the guide rails 27A to open and close the lower ends of the respective chutes 26. Each shutter 27B temporarily holds the cut pasta strips 3C within the corresponding chute 26, and, upon the pasta in the chute 26 reaching a predetermined amount, opens the lower end of the chute 26 to drop the pasta into a pasta stirrer 28 which will be described hereinlater.

The pasta stirrer 28 which is located beneath each quantitative distributor 27 is largely constituted by ducts 29 which guide the bundles of pasta strips 3C from the chutes 26 into cups 31, and air nozzles 30 which are provided on the ducts 29 to inject compressed air from outside along the inner periphery of each duct 29. The pasta strips 3C which are in the form of bundles are loosened and separated from each other by the turbulent air streams which are formed on the respective ducts by air Jets from the air nozzles 30.

Figure 7:
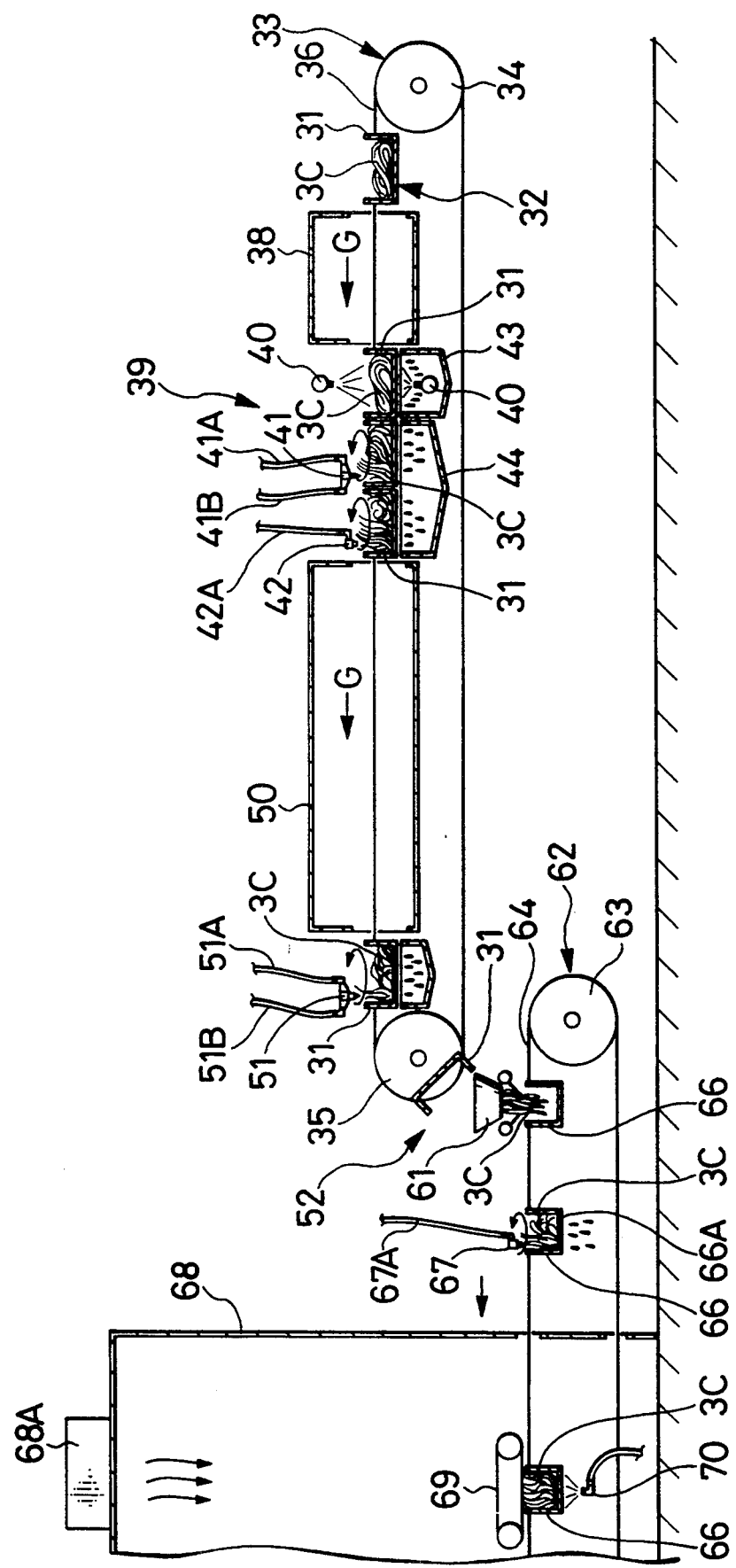
FIG. 7 is a schematic view of a processing line including a steam-cooker, a sprayer assembly, an inverter and a drier.
Figure 8:
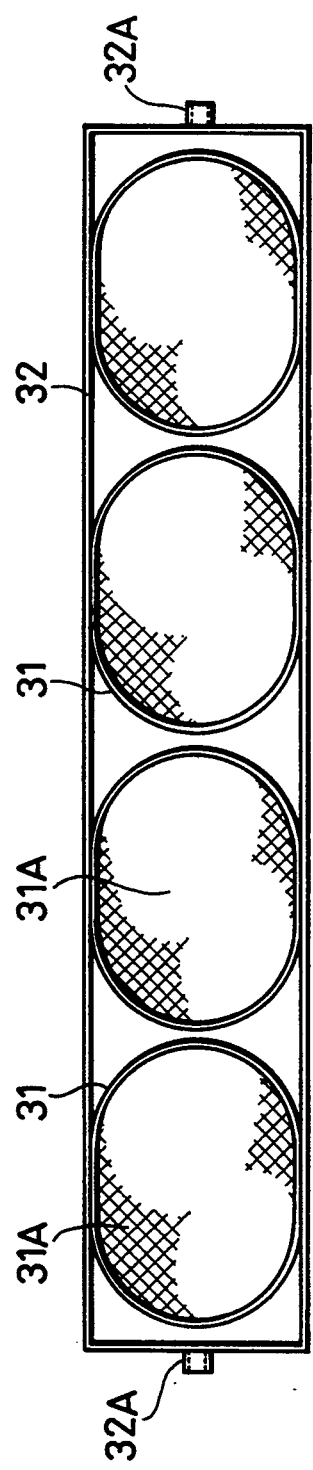
FIG. 8 is a schematic plan view of a cup retainer holding four cups thereon.
Figure 9:
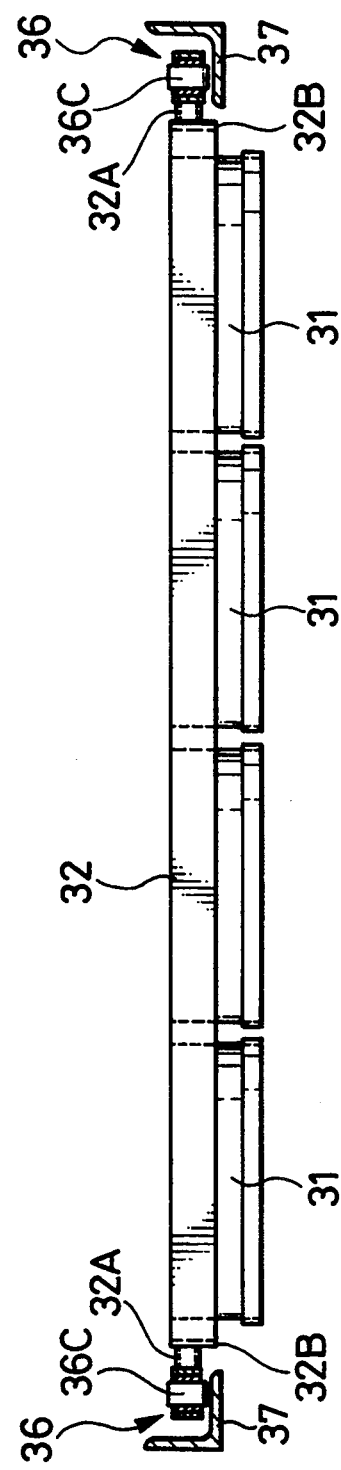
FIG. 9 is a partly sectioned front view of the cup retainer of FIG. 8, supported between a couple of chains.

Denoted at 31 are cups in which the loosened pasta strips 3C from the stirrer 28 are charged in a predetermined amount suitable as one meal. As shown in FIGS. 7 and 8, each cup 31 is of a bottomed cylindrical shape having a draining mesh 31A at its bottom (FIG. 8). Indicated at 32 is a cup retainer 32 which is arranged to carry four cups 31 side by side in an array, and provided with bearing portions 32A at the opposite longitudinal ends thereof. Each of these bearing portions 32A is rotatably supported on a chain 36 through a support shaft 36D which will be described hereinlater. The cup retainer 32 is provided with rod abutting portions 32B on the lower side of its opposite longitudinal ends for abutting engagement with a roller 58 which will be described hereinlater.

Figure 10:
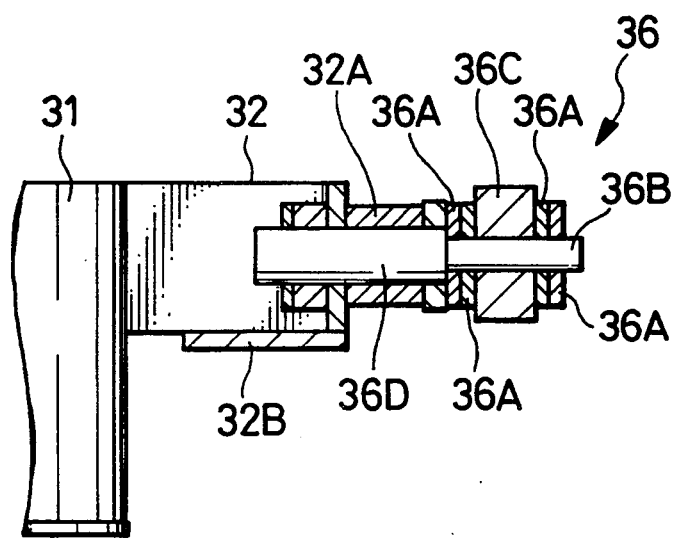
FIG. 10 is a schematic sectional view on an enlarged scale of the chain shown in FIG. 9.
Figure 11:
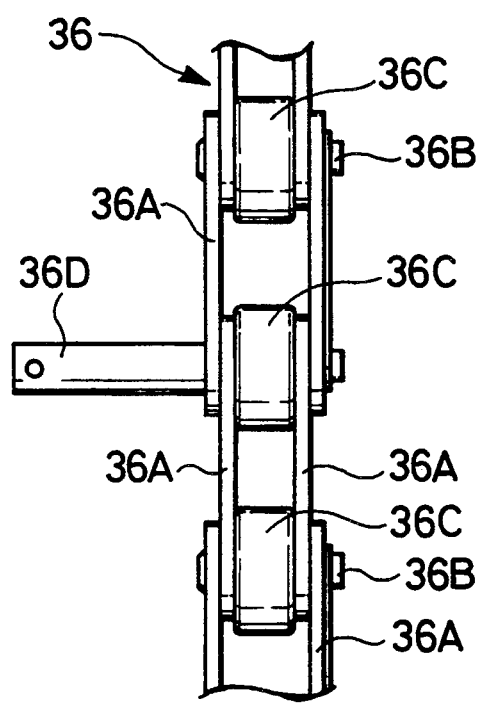
FIG. 11 is a schematic plan view of the chain shown in FIG. 10.

The reference numeral 33 denotes a conveyer or a first cup transfer means which transfers the cups 31 to the downstream side together with the cup retainer 32 while receiving the pasta strips 3C for one meal in each one of the cups 31. As shown in FIG. 7, the conveyer 33 is in the form of a chain conveyer having a pair of parallelly spaced chains 36 lapped between and around sprockets 34 and 35. As seen in FIGS. 10 and 11, each chain 36 is composed of link plates 36A which are pivotally connected by pins 36B along with rollers 36C.

Further, each chain 36 is provided with support shafts 36D integrally with the pins 36B at predetermined intervals along the length of the chain. Each support shaft 36D is connected to a bearing portion 32A of the cup retainer 32. By driving the respective chains 36 on and along guide rails 37 of FIG. 9 through a drive source (not shown) which is coupled with the sprocket 34, the conveyer 33 transfers the cups 31 on the cup retainer 32 in the direction of arrow G in FIG. 7 to first and second steam-cookers 38 and 50.

Indicated at 38 is the first steam-cooker which is located in the path of the conveyer 33 as a primary cooking means for steaming the pasta strips 3C in the cups 31 which are being transferred by the conveyer 33, for example, for about 40 seconds in steam of 100° under normal pressure.

The reference numeral 39 denotes a spray assembly which is located in the path of the conveyer 33 downstream of the steam-cooker 38 to serve as a means for loosely separating the pasta strips in each cup. As shown in FIG. 7, the spray assembly 39 is provided with hot water nozzles 40 which are located on the upper and lower sides of the mesh-like cup 31 to spray, for example, hot water of 80° toward the pasta strips 3C in the cup 31 at a flow rate of 2.5 l/min, a rotary nozzle 41 which is located on the upper side of the cup 31 downstream of the hot water nozzles 40 to spray, for example, an emulsion toward the pasta strips 3C in the cup 31 at a rate of 0.8 l/min along with compressed air of 5 kg/cm$^2$ through hoses 41A and 41B, respectively, a rotary air nozzle 42 which is located above the cup 31 downstream of the rotary nozzle 41 to spray, for example, compressed air of 5 kg/cm$^2$ toward the pasta strips 3C in the cup 31 through a hose 42A, and hot water and emulsion recovery vessels 43 and 44.

Figure 12:
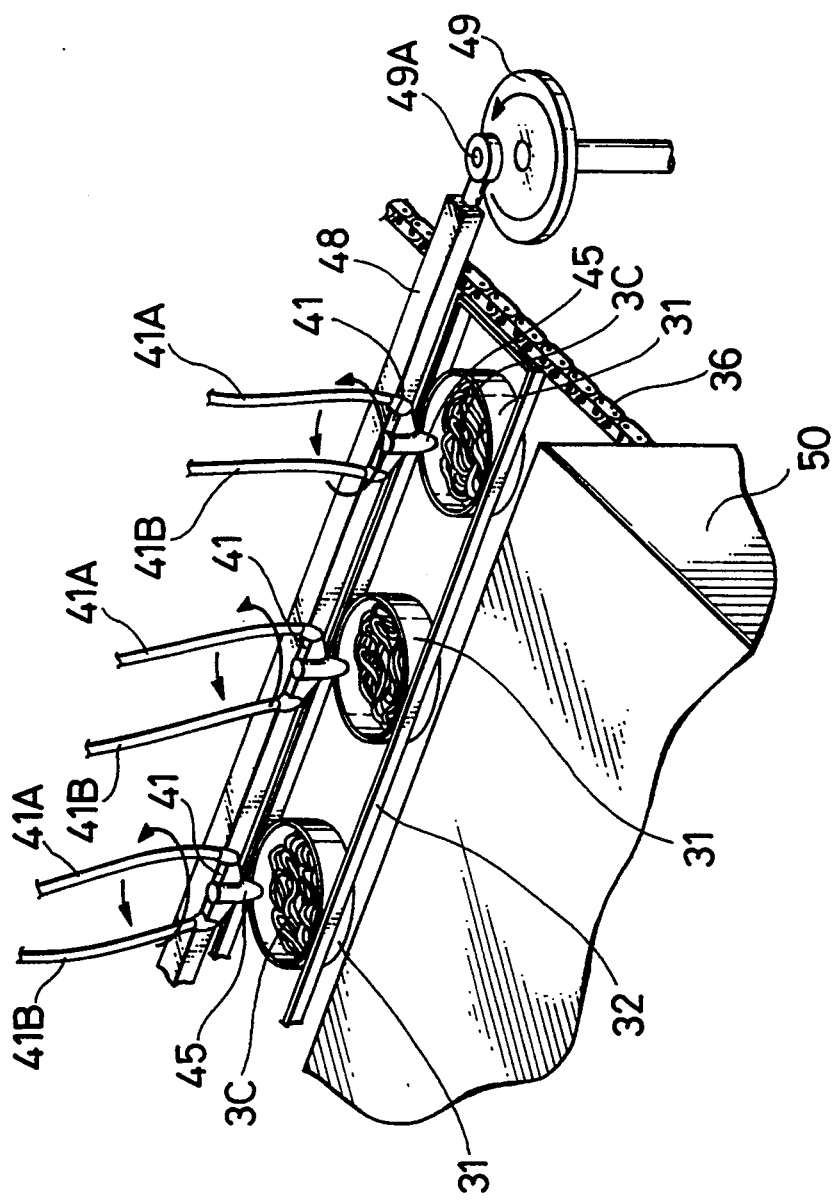
FIG. 12 is a fragmentary perspective view of rotary nozzles being rotated by a rotating plate.
Figure 13:
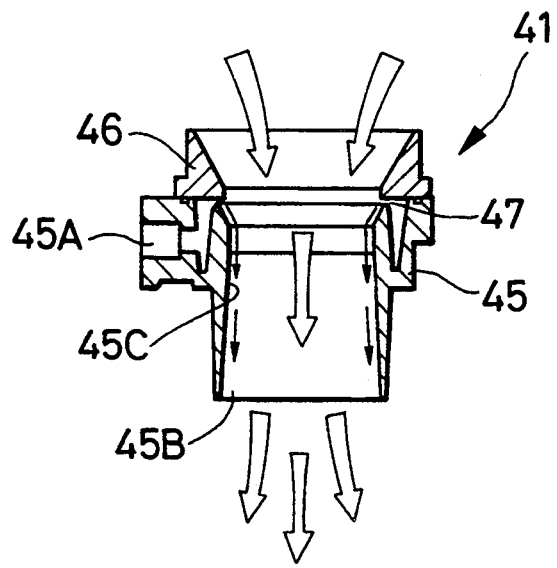
FIG. 13 is a schematic vertical section on an enlarged scale of one rotary nozzle.
Figure 14:
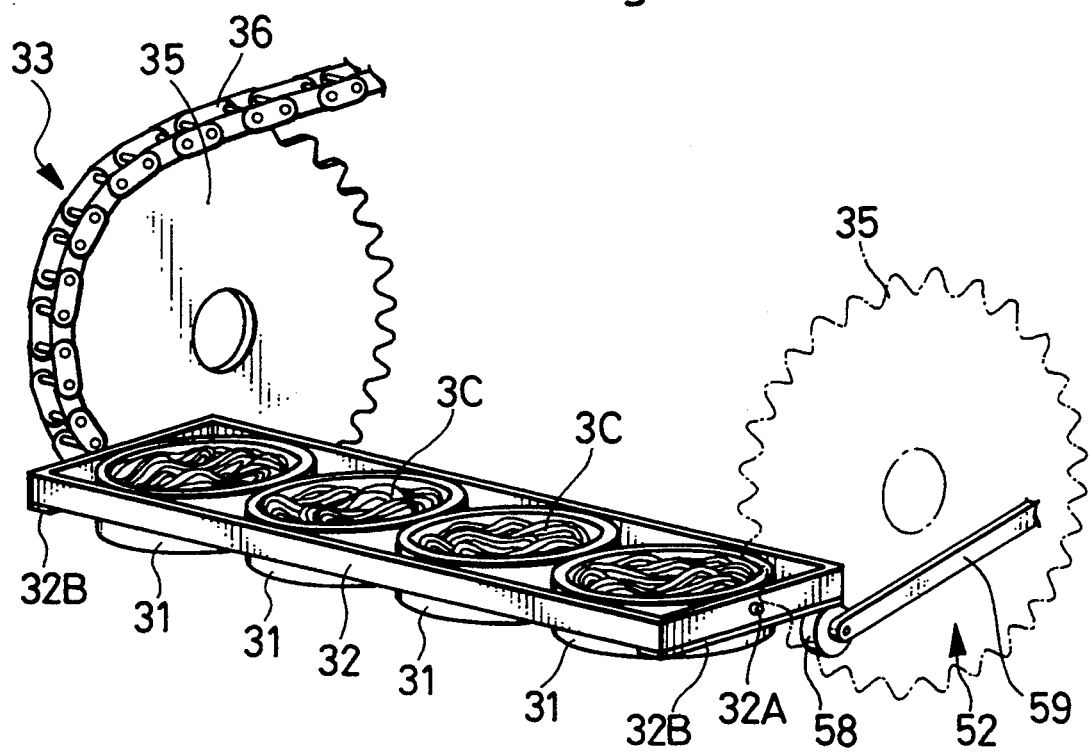
FIG. 14 is a schematic perspective view of a cup retainer immediately before being turned upside down by a cup retainer inverting mechanism.

In this embodiment, as shown in FIGS. 12 and 13, each rotary nozzle 41 of the spray assembly 39 is provided with a nozzle body 45 on the front side and has an air induction passage 45A connected to the hose 41B. The compressed air which flows into the air induction passage 45A is sprayed along the inner periphery 45C of the nozzle body 45 through an annular gap space 47 between the air induction passage 45A and a suction port 46. The suction port 46 is connected to the hose 41A, sucking in the emulsion from the hose 41A by entrainment on the air streams flowing into the nozzle body 45 through the annular clearance 47. Thus, the emulsion is sprayed toward the pasta strips 3C in the cup 31 from a nozzle hole 45B along with air, for example, approximately at a hundred times increased flow rate.

As shown in FIG. 12, the rotary nozzles 41 are mounted at predetermined intervals along the length of a connecting rod 48, the base end of which connecting rod is pivotally connected to a rotary disc 49 with a certain degree of eccentricity. As the rotary disc 49 is turned in the arrowed direction in FIG. 12 by an electric motor (not shown) or other suitable drive means, the respective rotary nozzles 41 are turned by the connecting rod 48 around a circle having a radius corresponding to the above-mentioned degree of eccentricity. In this instance, the pin 49A is fitted selectively in one of a plural number of setting holes (not shown) which are bored into the rotary disc 49 to permit adjustment of the radius of turns of the rotary nozzles. The air nozzle 42 and rotary nozzle 51, which will be described hereinlater, are also imparted with revolving motions by a mechanism similar to the combination of the connecting rod 48 and rotary disc 49.

In this manner, the pasta strips 3C are sprayed with hot water from the respective nozzles 40 of the spray assembly 39 in a sufficient amount for accelerating wet-swelling (α-conversion) of starch components for the improvement of the palatable feeling. The rotary nozzles 41 are turned in the arrowed direction (e.g., at a speed of 190–200 rpm with a radius of revolution of 130 mm) to spray the emulsion and air toward the pasta strips 3C, thereby separating the individual pasta strips 3C which are otherwise likely to adhere to each other as a result of the primary steam-cooking and at the same time depositing the emulsion on the surfaces of the pasta strips 3C to prevent their cohesion in the following secondary steam-cooking. The air nozzle 42 is also turned in the arrowed direction (e.g., at a speed of 190–200 rpm with a radius of revolution of 130 mm) to spray compressed air toward the pasta strips 3C in the cup 31, thereby removing emulsion residues at the bottom of the cup 31 and preventing cohesion of the pasta strips 3C which might otherwise occur as a result of exudation of starch components in the following secondary steam-cooking, while further separating the pasta strips 3C which have not been loosened by the rotary nozzle 41.

Indicated at 50 is the second steam-cooker which is located as a secondary cooking means in the path of the conveyer 33 downstream of the spray assembly 39. The steam-cooker 50 is arranged to secondarily cook the pasta strips 3C in the cups 31 which are being transferred by the conveyer 33, for example, for 3–4 minutes in steam of 100° C. under normal pressure. The reference 51 denotes rotary nozzles similar to the rotary nozzles 41 of the spray assembly 39, the rotary nozzles 51 being located downstream of the steam-cooker 50 to spray an emulsion from a hose 51B and compressed air from a hose 51B toward the pasta strips 3C in the cups 31. By spraying an emulsion and compressed air, the rotary nozzles 51 loosen the pasta strips 3C which have become cohesive as a result of the secondary steam-cooking, while preventing their cohesion in the subsequent drying stage by deposition of the emulsion.

Figure 15:
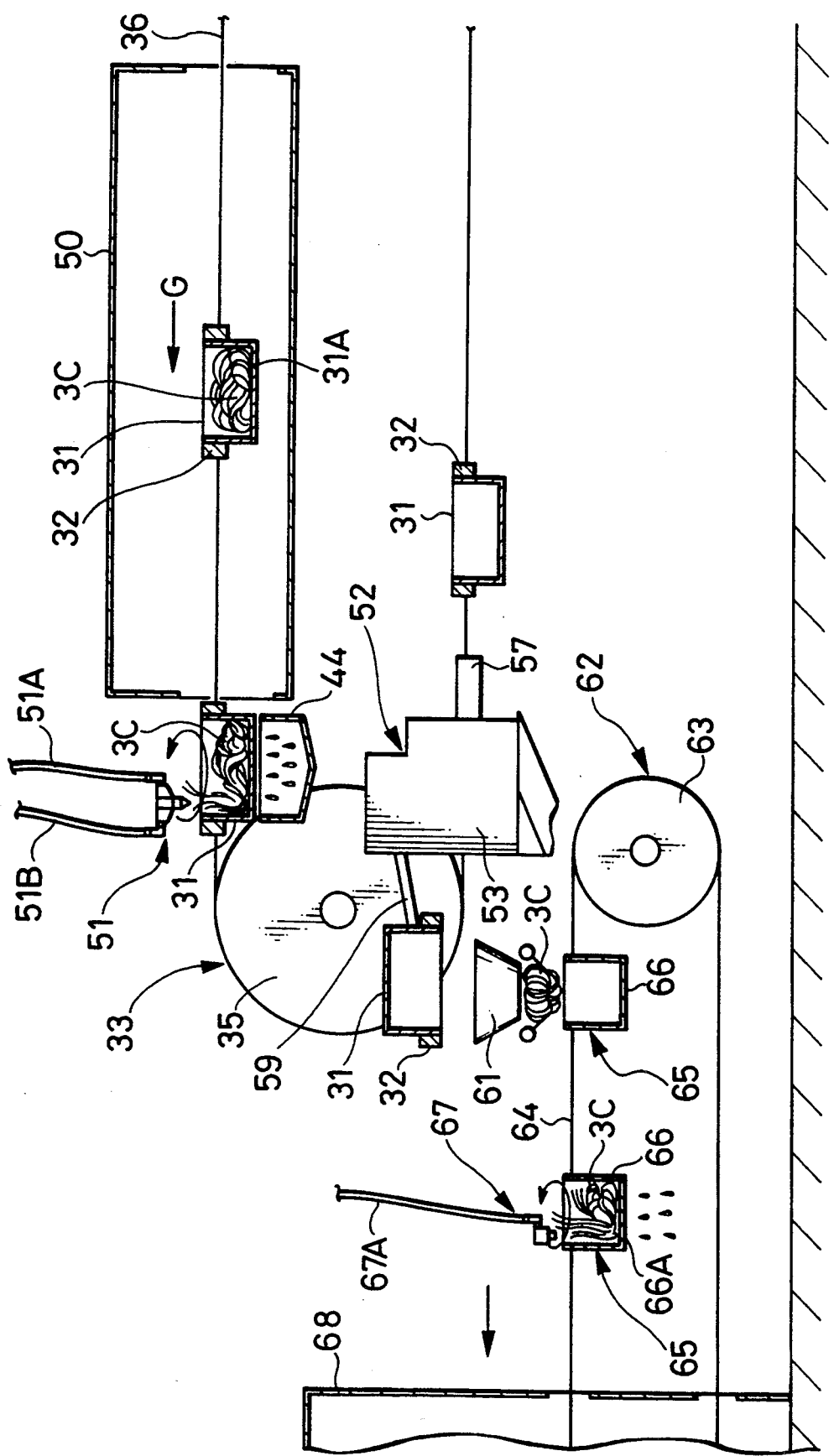
FIG. 15 is a schematic view of the cup retainer inverting mechanism.
Figure 16:
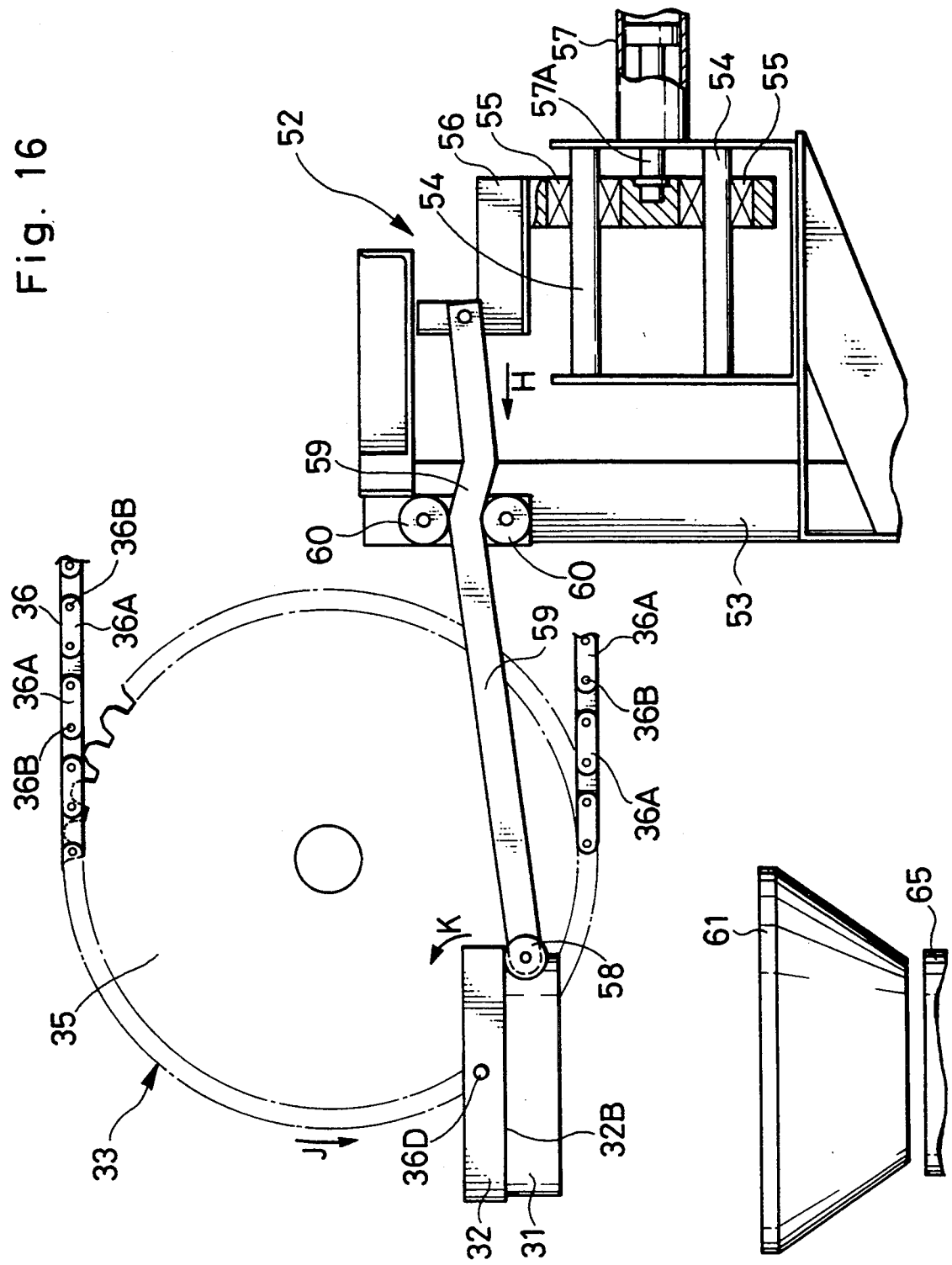
FIG. 16 is a partly cutaway view of the cup retainer inverting mechanism.

Designated at 52 is a cup inverting mechanism which is located on the downstream side of the conveyer 33 to turn upside down the cup retainer 32 together with the respective cups 31 which are being transferred by the conveyer 33. As shown in FIGS. 15 and 16, the cup inverting mechanism 52 includes a base 53 which serves as a support frame, a pair of parallel guide rods 54 which are mounted on the base 53, a slider 56 slidably supported on the guide rods 54 through slide bearings 55, an air cylinder 57 which is fixedly mounted on the base 53 to move the slider 56 reciprocably in the direction of arrow H along the guide rods 54 by stretching out a rod portion 57A, an inverting rod 59 which is pivotally connected at its base end to the slider 56 and provided with an abutting roller 58 at its fore end for abutting engagement with the rod contacting portion 32 of the cup retainer 32 at an eccentric position with respect to the support shafts 36D of the chains 36 to turn the cup retainer 32 upside down in the direction of arrow K as shown in FIG. 16, and a pair of support rollers 60 which are mounted on the base 53 to support the inverting rod 59 from the upper and lower sides thereof. The base 53, slider 56 and air cylinder 57 constitute a inverting rod drive mechanism.

In this instance, the rod 59 of the inverting mechanism 52 is bent in a middle portion of its length to form an angularly raised bent portion 59A, which is moved forward past the rollers 60 as shown in FIG. 17(a) when the base end of the inverting rod 59 is pushed by the slider 56 in the direction of arrow H in FIG. 17, thereby pushing the roller 58 at the fore end of the rod 59 in a forwardly upward direction to turn the cup retainer 32 on the chains 36 of the conveyer 33 in the direction of arrow K about the axes of the support shafts 36D of the chains 36. As a result, the cup retainer 32 is instantly turned upside down as shown in FIGS. 17(b) and 17(c).

Indicated at 61 are a plural number of hoppers (only one hopper is shown in FIG. 15) which are located under the cups 31 being turned upside down by the inverting mechanism 52. The reference 62 denotes another conveyer or a second cup transfer means which is located under the respective hoppers 61 and beneath the downstream end of the conveyer 33, the conveyer 62 being constituted by a chain conveyer similar to the conveyer 33 and including a pair of sprockets 63 (only one of which is shown) provided at its upstream end in the direction of the cup transfer, another pair of sprockets (not shown) provided at its downstream end, a pair of chains 64 (only one of which is shown) lapped around and between these sprockets 63 through a drier 68 which will be described hereinlater.

Figure 19:
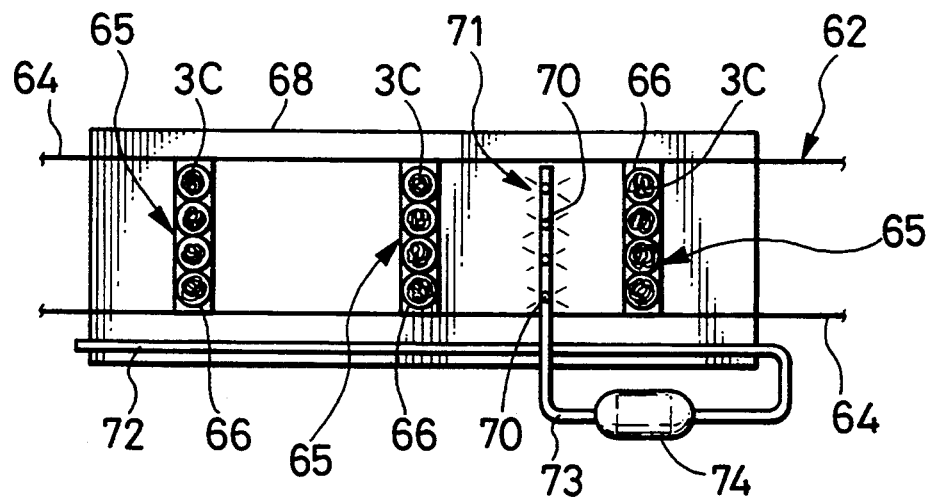
FIG. 19 is a schematic plan view of hot air injector provided on the drier.

Positioned between the chains 64 and at predetermined intervals along the path of the conveyer 62 are receiver cups 65 each holding four cups 66 side by side as shown in FIG. 19 in a manner similar to the cup retainer 32. The receiver cups 65 are transferred to underneath the hoppers 61 by the conveyer 62 to receive loose webs of the pasta strips 3C which are dropped in inverted state from the cup retainer 32 through the hoppers 61, transferring the inverted webs of the pasta strips 3C further toward a downstream point by the conveyer 62.

Indicated at 67 is another rotary nozzle assembly which is located in the path of the conveyer 62 between the hoppers 61 and drier 68 to serve as a second pasta loosening means. Similarly to the rotary nozzle 51, this rotary nozzle 67 is arranged to be turned while spraying compressed air from a hose 67A toward the pasta strips 3C in each cup 66 to loosen the individual pasta strips 3C uniformly. By the turbulent air streams blasted against the inverted pasta strips 3C in the cup 66 by the rotary nozzle 67, the emulsion which has been sprayed along with air by the rotary nozzle 51 is uniformly distributed over the entire surfaces of the pasta strips 3C, and excessive emulsion is removed through the mesh 66A at the bottom of each cup 66, while the web of the pasta strips 3C in each cup 66 is reshaped to evenly nest in the cup 66.

Indicated at 68 is a drier which is located in the path of the conveyer 62 downstream of the rotary nozzle 67, and, as shown in FIG. 7, provided with a heater 68A on the upper side to dry the pasta strips 3C in each cup 66 in hot air from the heater 68A, for example, for 40 minutes at 90° C. On the upper and lower sides of the conveyer 62, the drier 68 is further provided with a blocking member 69 for preventing the pasta strips 3C from jumping out of the cups 66, and air nozzles 70 for blowing compressed air higher than 4.0 kg/cm$^2$, for example, compressed air of 4.2 kg/cm$^2$ toward the pasta strips 3C in each cup 66 from beneath while whirling the drying and solidifying pasta strips 3C within the cup 66 by the blasts of hot air from the heater 68A to finish the pasta strips 3C into a bulky web of an ideal form which has interstices between the individual pasta strips 3C to prevent irregularities in the restorative power when cooked prior to serving.

Figure 18:
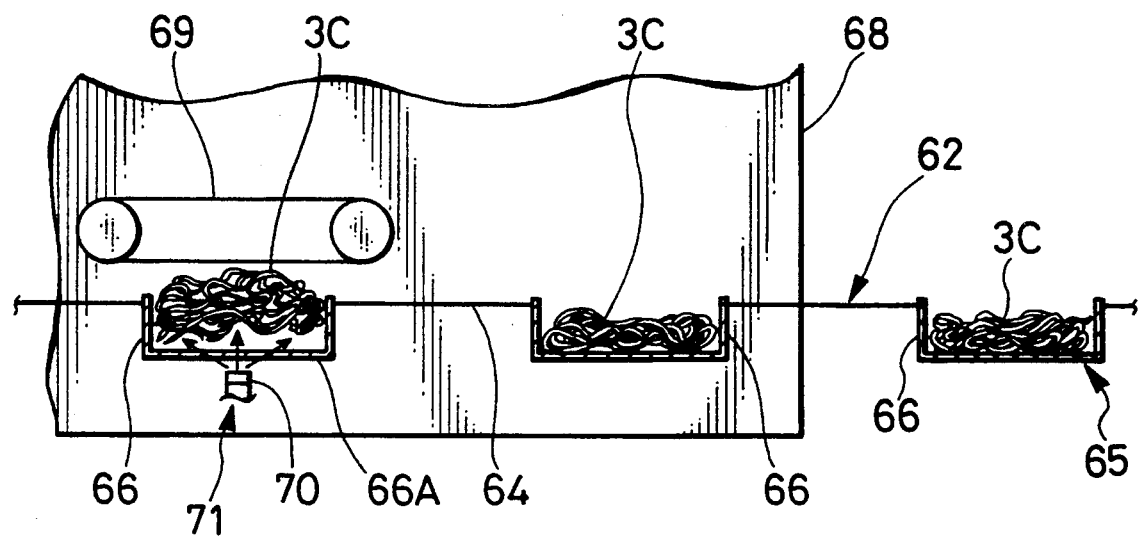
FIG. 18 is a schematic front view of a drier.

As shown in FIGS. 18 and 19, each air nozzle 70 constitutes part of a heated air injector 71 which includes an air duct 72 which is extended along the length of the drier 68 to have air in the duct 72 heated by hot air from the heater 68, and a compressor 74 for pressurizing air from the duct 72 and supplying compressed air into a discharge pipe 73. The discharge pipe 73 of the heated air injector 71 is extended transversely within the drier 68 and provided with, for example, four upwardly directed air nozzles 70 at predetermined intervals along the length thereof. Toward the pasta strips 3C which are being dried to a moisture content of 20–55%, preferably to a moisture content of 40–50%, the air nozzles 70 inject heated air through the bottom mesh 66A of each cup 66 to form interstices between the individual pasta strips 3C in the cup 66 to form a loose web of a bulky shape, uniformly drying and setting the pasta strips 3C in that shape.

With the instant-cooking pasta manufacturing apparatus of the invention as described above, the raw dough 3 mixed by the flour wet-mixer 2 of FIG. 2 is transferred toward a downstream point by the conveyer 4 to divide the raw dough 3 by the apportioning mechanism 5 into dough 3A and dough 3B in a predetermined ratio.

The dough 3A is then flatly spread on the conveyer 1 by the leveling mechanism 7 and subjected to preliminary steam-cooking in the steam-cooker 8 to prepare preliminarily cooked dough 3A$_1$ having 93% or higher α-conversion rate, which is thereafter transferred onto a conveyer 11 while being cooled off through the cooler 9. On the conveyer 11, the preliminarily cooked dough 3A$_1$ is joined with the uncooked dough 3B from the conveyer 10 and uniformly mixed with the latter in the mixer 12. The mixed dough which comes out of the mixer 12 is shaped into raw pasta strips 3C by the molding mechanism 14.

Next, the pasta strips 3C are cut into a predetermined length by a pasta cutting mechanism 15 and, as shown in FIGS. 5 and 7, filled into cups 31 each in an amount corresponding to one meal, transferring the filled cups 31 to a downstream point by the conveyer 33. Then, after primary cooking of the pasta strips 3C at the primary steam-cooker 38, the pasta strips 3C in the cups 31 are sprayed with hot water from the respective hot water nozzles 40 of the sprayer assembly 39 to accelerate α-conversion of starch components, and then with an emulsion from the rotary nozzles 41 and air from the air nozzles 42 to dissociate the individual pasta strips 3C from each other for prevention of their cohesion. The loosened pasta strips 3C are then subjected to secondary steam-cooking in the steam-cooker 50, and, after being further loosened by the emulsion and air sprayed from the rotary nozzle 51, the cups 31 are turned upside down to drop the loosened webs of the pasta strips 3C into the cups 66.

The loose webs of the pasta strips 3C which have been received in the cups 66 are further loosened by air jets from the air nozzles 67 from above while being gradually dried and cured within the drier 68 to take an ideal finish shape with aid of the air nozzle 70 which spurts heated air from beneath to maintain the pasta strips 3C in loosened state in the course of the drying. After the drying treatment, the webs of the pasta strips 3C are cooled and transferred to a packaging line as an instant-cooking pasta product 75 such as macaroni, spaghetti, vermicelli, oriental noodle or the like.

Figure 20:
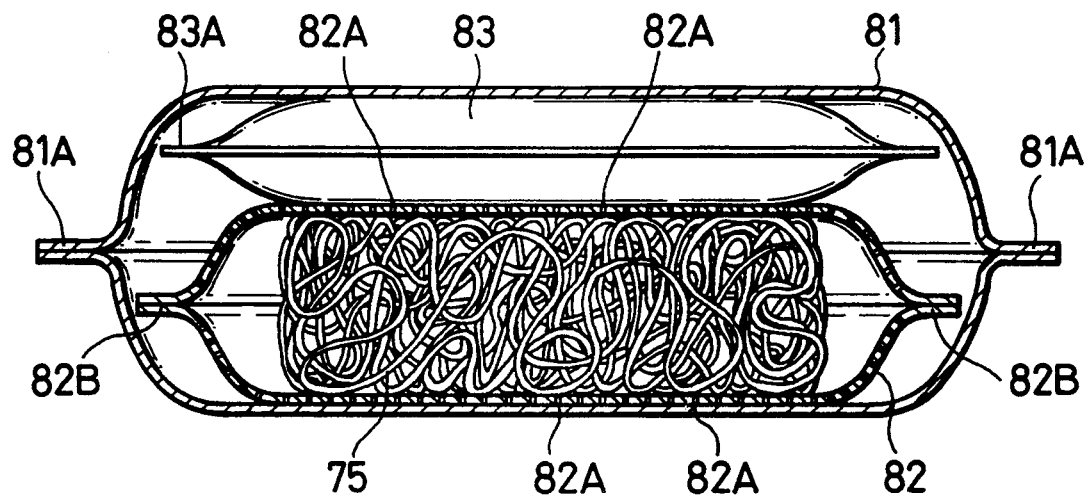
FIG. 20 is a longitudinal section of an encased instantly cookable pasta product sealed in an outer casing.
Figure 21:
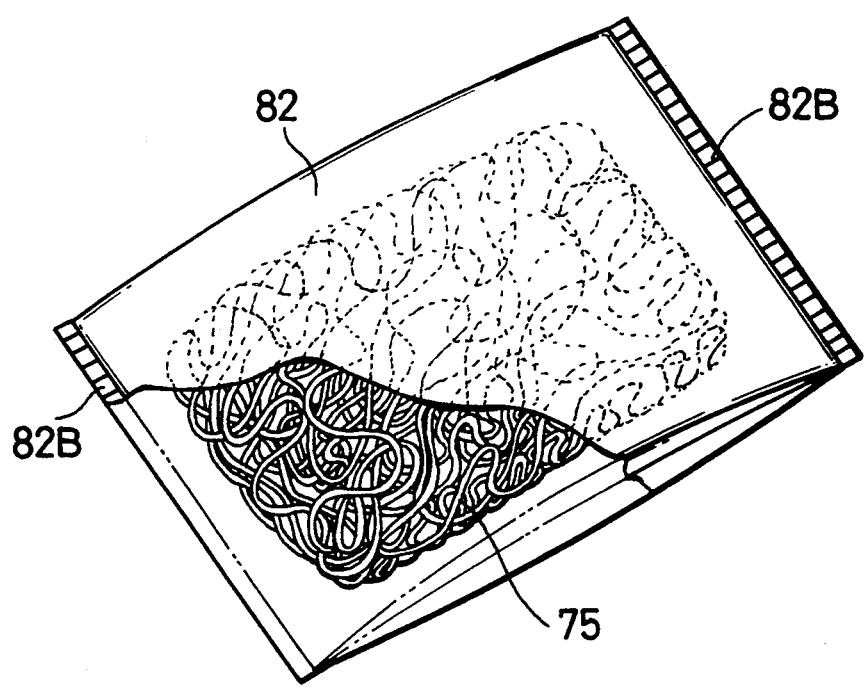
FIG. 21 is a partly cutaway perspective view of the encased instantly cookable pasta product.

Referring now to FIGS. 20 and 21, there is shown a packaged instant-cooking pasta product 75. In these figures, indicated at 81 is an outer casing substantially of a rectangular shape, which packages the instant-cooking pasta product 75 therein and which has its peripheral edges hermetically sealed by heat seal portions 81A.

The reference 82 denotes an inner casing which enshrouds the instant-cooking pasta product 75 as an inner package, the inner casing being formed of a heat resistant water-permeable material (e.g., porous film, nonwoven fabric, mesh etc.), for example, in the form of a bag of a synthetic resin material such as polyester, polyethylene, polypropyrene, nylon or the like having a multitude of pores 82A which intercommunicates the inner and outer sides of the casing. The instant-cooking pasta product 75 which has been produced in the above-described manner is put in the inner casing 82 in the packaging stage, closing the heat seal portions 82B by hot caulking or other suitable means to package the pasta 75 therein.

Indicated at 83 is a supplement pouch which is packaged in the outer casing 81 along with the inner package 82. The supplement pouch 83 contains seasonings or relishes and is hermetically closed along heat seal portions 83A.

A meal is prepared from the encased instantly cookable pasta product 75 which is packaged in the outer casing 81, in the manner as follows.

Firstly, after opening the outer casing 81, one takes out the encased pasta product 75 from the outer casing 81 as shown in FIG. 21 and puts it in hot water in the encased state. While boiling the pasta 75 for a few minutes, hot water permeates into the instantly cookable pasta 75 as a whole through the pores 82A of the water-permeable package 82 to restore the cooked edible state of the pasta.

The cooked pasta 75 is then taken out of the hot water along with the water-permeable casing 82, and, for example, put in cold water, whereupon cold water is circulated through the pores 82A of the inner casing 82 to cool off the pasta 75. Thereafter, the inner casing 82 enshrouding the pasta 75 is recovered from the cold water and opened to take out the cooked and cooled pasta 75. The pasta 75 can now be served simply by opening the supplement pouch 83 and pouring or mixing the seasonings or relishes with the pasta 75.

In a case where the pasta 75 is to be served in hot or heated state, it is desirable to put the pasta 75 in the water-permeable inner casing 82 in hot water and, after removing slimy exudation of starch components from the pasta surfaces in that or fresh hot water, to reheat the pasta 75 in fresh hot water together with the inner casing 82 before serving.

In this manner, according to this embodiment of the invention, a portion of raw dough 3 is subjected to preliminary steam-cooking and re-mixed with the remaining uncooked portion of the dough before forming same into raw pasta 3C of a predetermined shape to suppress thermal degeneration of gluten in the cords or strips of the raw pasta 3C, permitting to form desired gluten structure and to impart suitable viscosity and elasticity which are key factors in forming pasta strips 3C of an aimed shape by means of shaping rolls or a pasta extruder 14.

Subsequent to the shaping, the pasta strips 8C are charged into cups each in an amount corresponding to one meal, and the individual pasta strips 3C which have undergone the primary steam-cooking are loosened or separated from each other by means of the spray assembly 39 in the course of the transfer to the secondary steam-cooking, thereby to perform the process efficiently from the steam-cooking to drying treatment and to prevent exudation of starch components from the pasta strips 3C at the steam-cooking stage while accelerating wet-swelling of starch components to increase the viscosity for improvement of the aldente touch (elasticity and feeling of consistency). Even in a case where the instant-cooking pasta 75 is in the form of strips which have a large contact area like spaghetti and noodle, cohesion of the pasta strips can be effectively prevented by the combination of the preliminary, primary and secondary steam-cooking treatments, ensuring favorable viscosity and elasticity along with smooth feeling in the mouth. Besides, the pasta strips 3C can be effectively protected against cracking during the drying treatment.

The pasta product 75 in the water-permeable inner casing 82 can be put in hot water as it is, namely, in the encased state, so that the boiled pasta 75 can be recovered from hot water in a facilitated manner, and can be boiled to a sufficient degree without possibilities of impairing the shape of the instant-cooking pasta 75. The pasta 75 can be continuedly retained in the inner casing 82 to keep it in shape when cooling the pasta in cold water, when reheating it in hot water or when washing it with water for removal of slimy components from pasta surfaces.

Namely, there is no need for putting the pasta strips in a wire basket nor there are possibilities of the pasta strips flowing out when boiling or washing them. Further, when washing the pasta 75 with water for removal of slimy components from the surface of the pasta surface, the inner casing 82 which contains the pasta 75 permits to wash the individual pasta strips uniformly to a sufficient degree. Therefore, there is no possibility of the pasta 75 spoiling the flavor of a soup with which it is to be served.

Preferably, each inner casing 82 is charged with the instantly cookable pasta 75 in an amount suitable for one person, so that one can prepare the pasta 75 for a plural number of persons simultaneously simply by cooking the pasta in a corresponding number of inner packages 82, without the trouble of metering or apportioning the pasta before or after boiling same.

Further, all through the boiling process, the instantly cookable pasta 75 is held in a somewhat restrained state within the inner casing 82 to prevent deteriorations in palatable tough or breakage of pasta cords which would occur when the pasta is allowed to swirl in boiling water.

The inner casing is very hygienic because the pasta can be cooked free of direct touches by hands.

The invention is illustrated more particularly by way of the following examples.

EXAMPLE 1 AND CONTROLS 1-3

In Example 1, 30 parts by weight (hereinafter referred to simply as "parts" for brevity) of Durum wheat flour, 70 parts of strong wheat flour and 30 parts of water were mixed in a mixer to prepare a dough of starting mixture. 30 wt % of the dough (with a moisture content of 31-32 wt %) was apportioned as a first mixture, which was filled in a container flatly in a thickness of 10 mm and preliminarily cooked for 4 minutes in steam of 100° C. under normal pressure (up to an a-conversion rate higher than 95%). The preliminarily cooked was then cooled to a temperature below 40° C. and mixed with the remaining uncooked dough, shaping the resulting mixture into spaghetti cords by means of a pasta extruder employing die apertures each having an outside diameter of 2.0 mm and a 1.0 mm diameter center pin (extrusion wall thickness: 0.5 mm).

The raw spaghetti cords (Bucatini type) were cut into a length of 400 mm, and divided by metering into globular lumps of 140 grams prior to charging same into cups. The spaghetti cords in each cup was subjected to preliminary steam-cooking for 40 seconds in steam of 100° C. under normal pressure, and then sprayed with hot water of 80° C. at a rate of 2.5 l/min. Separately, an emulsion was prepared by mixing 5 parts of hardened oil, 95 parts of water and 0.1 part of sugar ester of HLB14 in a homomixer. 2 seconds after the primary steam-cooking, the spaghetti cords were loosely separated from each other in a shower of the emulsion, removing excessive emulsion by the air spray. Thereafter, the spaghetti in each cup was subjected to the secondary steam-cooking for 3 minutes in steam of 100° C. under normal pressure, followed by drying in hot air blasts of 90° C. for 40 minutes and cooling to obtain instantly cookable spaghetti.

In Control 1, instantly cookable spaghetti was produced by repeating Example 1 except for omission of the step of preliminarily steam-cooking part of the dough of the starting mixture from the mixer (i.e., using only uncooked dough). In Control 2, instantly cookable spaghetti was produced by repeating Example 1 except for omission of the step of preliminarily steam-cooking part of the dough of the starting mixture from the mixer and prolongation of the secondary steam-cooking time to 8 minutes. In Control 3, instantly cookable spaghetti was produced by repeating Example 1 except for omission of the step of preliminarily steam-cooking part of the dough of the starting mixture from the mixer and use of an emulsion composed of 10 parts of hardened oil, 90 parts of water and 0.2 parts of sugar ester of HLB14.

400 cc of hot water of 95° C. was poured on 100 g of the instantly cookable spaghetti specimens obtained in each of Example 1 and Controls 1 to 3. Upon lapse of a restoration time of 5 minutes, each specimen was evaluated by 15 panelists. The results of evaluation are shown in

TABLE 1

| Items | Ex. 1 | Ctrl 1 | Ctrl 2 | Ctrl 3 |
|---|---|---|---|---|
| Cord cohesion | Nil | Partly | Many | Nil |
| Unevenness in palatable touch (No. of Persons) | 0 | 12 | 15 | 0 |
| Insufficient resiliency (No. of Persons) | 0 | 10 | 9 | 13 |
| Excessive resiliency (No. of Persons) | 0 | 0 | 0 | 0 |
| Lacking smoothness (No. of Persons) | 0 | 5 | 11 | 3 |
| Smell inherent to raw wheat flour (No. of Persons) | 0 | 7 | 3 | 10 |
| Greasy taste (No. of Persons) | 0 | 0 | 2 | 13 |
| Cords out of shape (No. of Persons) | 0 | 7 | 7 | 8 |
| Overall Evaluation (Full marks: 10) | 10 | 3 | 1 | 4 |

Table 1, in which "No. of Persons" indicates the number of panelists giving a positive response to the corresponding item of evaluation out of 15 panelists.

As seen from Table 1, the instantly cookable spaghetti of Example 1 was transformed into edible state in 5 minutes after pouring hot water, restoring a palatable touch to the mouth including smoothness and elasticity free of cohesion of spaghetti cords and taste of raw wheat flour.

Thus, it was confirmed that the preliminary steam-cooking made it possible to obtain resilient and smooth pasta free of cohesion of individual pasta cords. In case of Controls 1 to 3 where the dough was subjected only to the primary and secondary steam-cooking treatments without the preliminary cooking, there were problems such as cohesion of pasta cords, unevenness in palatable touch, insufficient resiliency and smell of raw wheat flour despite the increased oil concentration in the emulsion and prolongation of the secondary steam-cooking.

Namely, Control 1 without the preliminary steam-cooking was inferior in restorative ability in hot water, suffering from the smell of raw wheat flour, cohesion of pasta cords in the loosening stage and deterioration in palatable touch or feeling. Control 2 with a prolonged secondary steam-cooking time was improved with regard to the smell of raw wheat flour but had a tendency of increasing the cohesion of individual pasta cords, leading to defective restoration due to insufficient permeation of hot water at the time of restoration in hot water. Control 3 using an emulsion composition with an increased oil concentration was immune from cohesion of pasta cords but was too greasy in taste as a whole.

EXAMPLE 2 & CONTROL 4

The instantly cookable spaghetti of Example 1 was put in a water-permeable bag-like casing of polypropyrene non-woven fabric, sealing off the opening of the casing by heat seal.

The resulting spaghetti package in the water-permeable casing was boiled in hot water for 4 minutes, and then taken out and immediately cooled in cold water together with the casing. After cooling, the casing was opened to take out the spaghetti.

In Control 4, the same spaghetti was boiled in hot water for 4 minutes without packaging same in the water-permeable casing, and the boiled spaghetti was put in a wire-mesh bowl and cooled in cold water.

The spaghetti specimens of Example 2 and Control 4, intermingled with a seasoning sauce, were evaluated by 20 panelists in the art.

The results are shown in Table 2 below.

TABLE 2

| Pasta cords | Example 2 | Control 4 |
|---|---|---|
| Smoothness | Very good | Medial |
| Consistency | Very good | Inferior |
| Irregularity in restorative power | No irregularity | No irregularity |

As clear from the foregoing results, the spaghetti of Example 2, which was in the water-permeable casing, was satisfactory in smoothness and consistency of the pasta cords and showed no irregularity in restorative power.

Thus, by combining the partial preliminary steam-cooking of the raw dough 3 with the primary and secondary steam-cooking treatments, it becomes possible to accelerate α-conversion of the pasta cords or strips 3C effectively and to make the structure of the pasta cords 3C uniform, while preventing their cohesion in a reliable manner. Besides, the resulting instant-cooking pasta product 75 has excellent restorative power, for example, restoring edible state in about 4 minutes when poured with hot water of 95° C. free of cohesion of individual pasta cords, which possess palatable touch of increased commercial value, including favorable smoothness and resiliency and good flavor without smell of raw wheat flour.

Although in the foregoing embodiment the water-permeable inner casing 82 is described as being formed of a heat resistant synthetic resin material such as polyester, polyethylene, polypropyrene or the like, it may be formed of non-woven fabric impregnated or laminated with a heat resistant synthetic resin material or of a combination of water resistant paper and non-woven fabric if desired.

Further, for the sake of convenience in handling, a string or thread may be attached to the water-permeable casing 82 to serve as a tub. In the stage of forming the water-permeable casing 82 into a bag-like shape, a number of perforations may be provided in the casing material in a degree which would not permit outflow of the pasta strips 75 or alternatively the heat seal portion 82B may be closed intermittently, thereby ensuring accelerated water permeation into the casing and preventing the water-permeable casing 82 from floating up to the surface when put in hot water. Such perforations or intermittent sealing also accelerate drainage of excessive hot water or excessive additives from the inner casing 82 after recovery from the hot water. Further, needless to say, the water-permeable casing 82 can be applied not only to the instant-cooking pasta as obtained by the process of the invention but also to boiled pasta or semi-boiled pasta.

The above-described pasta product may be accompanied by a pouch which contains seasonings or stock material in hermetically sealed state, or by a suitable combination of dried vegetables and meat which are packaged in the water-permeable casing 82 or supplement pouch 83. In such a case, flavors or colors may be imparted to the pasta while being boiled, by adding a stock material, seasonings, coloring agents or spices to the boiling water beforehand.

Further, although the inner casing 82 which contains the instant-cooking pasta product 75 is enshrouded in the outer casing 81 in the foregoing embodiment, the water-permeable inner casing 82 may be supplied separately so that the user can put the pasta product 75 in the casing at the time of cooking. Especially for the purpose of preservation, the pasta product may be sterilized after pH adjustment or packaged in a casing along with alcohol. By so doing, boiled pasta or semi-dried pasta can be preserved at room temperature over a long period of time, and the pasta can be boiled in a facilitated manner by the use of a separately supplied water-permeable casing.

Possibilities of Industrial Applications

It will be appreciated from the foregoing detailed description that, according to the present invention, part of the starting mixture is subjected to preliminary steam-cooking and then mixed with the uncooked remainder of the starting mixture before forming into unit pieces of a predetermined shape, thereby suppressing thermal degeneration of gluten component of the pasta to form a desired gluten structure while accelerating wet-swelling of starch components in the steam-cooking stage, to produce instantly cookable pasta of dried, semi-dried or boiled form which is favorable in resiliency and smoothness and free of the smell of raw wheat flour. Cohesion of individual pasta cords in the steam-cooking treatments is prevented to ensure uniform α-conversion and restorative power (in hot water) of the pasta.

Further, even in case of pasta pieces which have a broad contact area like spaghetti and noodle, the cohesion of the pasta pieces or cords is effectively prevented by the combination of the preliminary steam with the primary and secondary steam-cooking treatments, guaranteeing a palatable feeling including favorable resiliency and smoothness and improving the commercial value of the pasta products. In addition, the steam-cooking in cups contributes to make the whole process compact and efficient, from the primary steam-cooking to the drying stage.

Moreover, the instant-cooking pasta enshrouded in the water-permeable casing has a number of advantages as a commercial product in that it can be cooked and handled package by package in a facilitated manner and without impairing the shape and flavor of the pasta.

We claim:

1. Encased instantly cookable pasta, comprising:
    instantly cookable pasta strips of a predetermined shape formed by shaping and drying a mixture containing wheat flour as a major component said pasta formed of a dough mixture including a mixture of a steam cooked first dough portion and a non-steamed uncooked second dough portion as ingredients in which the steam cooked first dough portion of the dough mixture is steam cooked prior to mixing with said non-steamed uncooked second dough portion and prior to formation of said mixture into said predetermined shape, and wherein said steam cooked first dough portion is 5–90% of said dough mixture, with the remainder of the dough mixture being the non-steamed uncooked second dough portion, wherein the instantly cookable pasta strips are formed by first preparing raw dough of a starting mixture containing wheat flour as a major component and having a predetermined water content, dividing the raw dough of the starting mixture into the first dough portion which is to be the steam cooked portion and which is 5–90% of the dough mixture, and with the remainder of the starting mixture constituting the second dough portion as the non-steamed uncooked second dough portion, preliminarily steam-cooking the first dough portion, mixing the steam-cooked first dough portion with the non-steamed uncooked second dough portion, forming the resulting mixture into raw pasta strips of the predetermined shape, subjecting the raw pasta strips to a primary steam-cooking treatment, subjecting the primarily cooked pasta strips to a secondary steam-cooking treatment, and drying the secondarily cooked pasta strips, and further wherein forming of the instantly cookable pasta strips includes loosely separating the individual pasta strips from each other at a point between one of: (a) the primary and secondary steam-cooking treatments, and (b) the secondary steam-cooking treatment and drying step; and
    a casing of a bag-like shape enshrouding said pasta strips and formed of a heat-resistant and water-permeable material.

2. Encased instantly cookable pasta as defined in claim 1, wherein said encased pasta is sealed in an outer casing for preservation purposes.

3. Encased instantly cookable pasta as defined in claim 2, wherein said outer casing contains a pouch of supplement seasonings along with said encased pasta.

4. The encased instantly cookable pasta of claim 1, wherein said steam cooked portion is 10–60% of said dough mixture.

5. The encased instantly cookable pasta of claim 1, wherein said steam cooked is cooked at approximately 100° C. for approximately 4 minutes.

6. Encased instantly cookable pasta strips comprising:
    instantly cookable pasta strips of predetermined shape, said instantly cookable pasta strips being made by the process comprising forming a starting dough, dividing said starting dough into a first portion and a second portion, said first portion corresponding to 5–90% by weight of said starting dough, subjecting said divided first dough portion to a preliminary steaming for a time and at a temperature until the alpha conversion rate of at least 93% is reached for said first dough portion, cooling said steamed first portion, mixing said cooked first portion with said second uncooked portion prior to shaping, shaping the resultant mixture of the first and second portions into predetermined pasta strips, subjecting the pasta strips to a primary steam cooking treatment, spraying said cooked pasta strips with hot water, subjecting the pasta strips to a secondary steam cooking, and then drying the pasta strips, the process further including loosening the individual pasta strips by the use of an aqueous emulsion and air, with said loosening step occurring at a point between one of: (a) the primary and secondary steam-cooking steps, and (b) the secondary steam-cooking step and the drying step; and
    a casing of a bag-like shape enshrouding said pasta strips and formed of a heat-resistant and water-permeable material.

* * * * *

UNITED STATES PATENT AND TRADEMARK OFFICE
CERTIFICATE OF CORRECTION

PATENT NO. : 5,342,634
DATED : August 30, 1994
INVENTOR(S) : Susumu MURATA, et al.

It is certified that error appears in the above-indentified patent and that said Letters Patent is hereby corrected as shown below:

On the title page item [75], should read
--Masayuki FUJIHIRA--

Signed and Sealed this

Fourth Day of April, 1995

Attest:

BRUCE LEHMAN

Attesting Officer

Commissioner of Patents and Trademarks